US012603679B2

(12) United States Patent
Wang

(10) Patent No.: US 12,603,679 B2
(45) Date of Patent: Apr. 14, 2026

(54) SIGNAL PROCESSING DEVICE AND DATA TRANSMISSION METHOD

(71) Applicant: Huawei Technologies Co., Ltd., Shenzhen (CN)

(72) Inventor: Jian Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/755,331

(22) Filed: Jun. 26, 2024

(65) Prior Publication Data
US 2024/0348296 A1 Oct. 17, 2024

Related U.S. Application Data

(63) Continuation of application No. PCT/CN2022/141305, filed on Dec. 23, 2022.

(30) Foreign Application Priority Data

Dec. 27, 2021 (CN) .......................... 202111619125.9

(51) Int. Cl.
| H04B 7/0413 | (2017.01) |
| H04B 7/06 | (2006.01) |
| H04Q 11/00 | (2006.01) |

(52) U.S. Cl.
CPC ......... *H04B 7/0413* (2013.01); *H04B 7/0617* (2013.01); *H04Q 11/0067* (2013.01)

(58) Field of Classification Search
CPC . H04B 7/0413; H04B 7/0617; H04Q 11/0067
See application file for complete search history.

(56) References Cited

U.S. PATENT DOCUMENTS

| 9,313,827 B2 | 4/2016 | Ilyadis |
| 9,778,557 B2 | 10/2017 | Eldar et al. |
| | (Continued) | |

FOREIGN PATENT DOCUMENTS

| CN | 110719238 A | 1/2020 |
| CN | 114466470 A | 5/2022 |
| JP | 2019536368 A | 12/2019 |

OTHER PUBLICATIONS

3GPP TR 38.816 V15.0.0 (Dec. 2017), RAN WG3, "3rd Generation Partnership Project, Technical Specification Group Radio Access Network; Study on CU-DU lower layer split for NR; (Release 15)", 3GPP Standard, Technical Report; pp. 1-16, XP051392783.
(Continued)

*Primary Examiner* — Rahel Guarino
(74) *Attorney, Agent, or Firm* — Slater Matsil, LLP

(57) ABSTRACT

This disclosure provides a signal processing device and a data transmission method, and relates to the communication field. A first signal processing device includes: an interface module, configured to perform Ethernet data transmission with a second signal processing device through an optical fiber; a scheduling module, configured to schedule to-be-processed data to a first processing module or a second processing module based on transmission configuration information; the first processing module, configured to process the data from the scheduling module according to a first splitting mode; the second processing module, configured to process the data from the scheduling module according to a second splitting mode.

20 Claims, 10 Drawing Sheets

(56) References Cited

U.S. PATENT DOCUMENTS

| 2015/0131643 | A1 | 5/2015 | Oren | |
| 2016/0212747 | A1 | 7/2016 | Effenberger et al. | |
| 2020/0337113 | A1 * | 10/2020 | Na | ......................... H04W 80/02 |
| 2021/0007039 | A1 | 1/2021 | Salahuddeen et al. | |
| 2021/0120527 | A1 | 4/2021 | Rhim et al. | |
| 2021/0243156 | A1 | 8/2021 | Mishra et al. | |

OTHER PUBLICATIONS

3GPP TR 38.801 V14.0.0 (Mar. 2017), RAN WG3, "3rd Generation Partnership Project; Technical Specification Group Radio Access Network; Study on new radio access technology: Radio access architecture and interfaces (Release 14)", 3GPP Standard; Technical Report; Mar. 2017, pp. 1-91, XP051298041.
Simone Redana et al: "5G PPP Architecture Working Group-View on 5G Architecture, Version 3.0", Jun. 19, 2019 (Jun. 19, 2019), pp. 1-166, XP055736939.
CPRI Specification V7.0: "Common Public Radio Interface(CPRI); Interface Specification", Oct. 9, 2015, 128 pages.
ECPRI Specification V2.0: "Common Public Radio Interface: eCPRI Interface Specification", May 10, 2019, 109 pages.
Common Public Radio Interface (CPRI), URL:http://www.cpri.info/spec.html, Dec. 20, 2016, 4 pages.

* cited by examiner

100

102

101

| BBU | | RRU | | Terminal device |

130

110    120    140

200

| BBU | | AAU | | Terminal device |

230

210    220    240

410

SIGNAL PROCESSING DEVICE AND DATA TRANSMISSION METHOD

CROSS-REFERENCE TO RELATED APPLICATIONS

This application is a continuation of International Application No. PCT/CN2022/141305, filed on Dec. 23, 2022, which claims priority to Chinese Patent Application No. 202111619125.9, filed on Dec. 27, 2021. The disclosures of the aforementioned applications are hereby incorporated by reference in their entireties.

TECHNICAL FIELD

This disclosure relates to the communication field, and more specifically, to a signal processing device and a data transmission method.

BACKGROUND

In a current cellular wireless communication system, a distributed access network device has been used as a main form of an access network device. Some distributed access network devices include a baseband unit (BBU) and a remote radio unit (RRU), and a first frequency band range supported by the distributed access network device is limited. With the evolution of technologies, some other distributed access network devices include a BBU and an active antenna unit (AAU), and support a second frequency band range different from the first frequency band range.

To meet requirements of different services, operators need to provide access network devices that support both the first frequency band range and the second frequency band range. Currently, the operators deploy both the RRU and the AAU to achieve this purpose. However, because the RRU and the AAU need to be installed separately, complexity is high, and hardware costs are excessively high.

SUMMARY

Embodiments of this disclosure provide a data transmission solution. A first signal processing device can simultaneously support two different splitting modes, so that a first frequency band range and a second frequency band range can be simultaneously supported. In this way, requirements of various services can be met using the first signal processing device. This can reduce deployment complexity, and reduce costs.

According to a first aspect of this disclosure, a first signal processing device is provided. The first signal processing device includes: an interface module, configured to perform Ethernet data transmission with a second signal processing device through an optical fiber; a scheduling module, configured to schedule to-be-processed data to a first processing module or a second processing module based on transmission configuration information from the second signal processing device, where the to-be-processed data includes Ethernet data from the second signal processing device or uplink data from an antenna module; the first processing module, configured to process the data from the scheduling module according to a first splitting mode; the second processing module, configured to process the data from the scheduling module according to a second splitting mode; and the antenna module is configured to send processed data of the first processing module or the second processing module and/or receive uplink data.

In this way, the first signal processing device may separately process, based on scheduling, the data according to the first splitting mode and the second splitting mode. It can be learned that the first signal processing device may simultaneously support two different splitting modes, so that requirements of various services can be met. In this way, an RRU and an AAU do not need to be separately deployed, so that complexity and costs are reduced.

In some possible implementations, the scheduling module is coupled to the interface module, the antenna module, the first processing module, and the second processing module. In this way, the scheduling module can schedule data from the interface module or the antenna module to the first processing module or the second processing module, to implement correct data distribution.

In some possible implementations, the first splitting mode is a time domain splitting mode, and the first processing module is configured to perform radio frequency RF processing on the data from the scheduling module. Optionally, the first splitting mode may indicate that physical layer processing is performed by a first baseband module of the second signal processing device, and the radio frequency processing is performed by the first processing module of the first signal processing device. Optionally, the first splitting mode maybe a splitting mode supporting a CPRI. In this way, the first signal processing device may support data processing of the CPRI.

In some possible implementations, the first processing module includes: a conversion submodule, configured to implement conversion between the Ethernet data and time domain data; and a beamforming submodule, configured to implement conversion between a first quantity of multichannel first time domain data and a second quantity of multichannel second time domain data. The second quantity corresponds to a quantity of antenna channels of the antenna module, and the first quantity is less than the second quantity.

In this way, the first processing module may convert the Ethernet data into the time domain data, so that beamforming can be performed in time domain, and correct data processing is ensured.

In some possible implementations, the to-be-processed data includes the Ethernet data from the second signal processing device, and a quantity of antenna channels corresponding to the Ethernet data is a first quantity. The conversion submodule is configured to determine the corresponding multichannel first time domain data based on the Ethernet data. The beamforming submodule, configured to determine the multichannel second time domain data based on the multichannel first time domain data and a second quantity of multiple first antenna weight parameters.

In this way, for downlink transmission, the time domain data can be recovered from the Ethernet data from the second signal processing device, and beamforming can be performed in time domain, so that the first signal processing device supports a time domain splitting mode, and can further support data processing in a first frequency band range.

In some possible implementations, the first processing module is coupled to the antenna module, and the antenna module is configured to send the multichannel second time domain data through multiple antenna channels. In this way, sending through the multiple antenna channels can fully use a feature of multiple antennas, to implement MIMO transmission.

In some possible implementations, the conversion submodule is configured to determine the multichannel first time domain data based on splitting of a payload of the Ethernet data. In this way, the corresponding time domain data can be obtained by splitting the payload of the Ethernet data, so that subsequent time domain processing can be performed on the time domain data.

In some possible implementations, the to-be-processed data includes the uplink data from the antenna module, and the uplink data includes the second quantity of multichannel second time domain data. The beamforming submodule is configured to determine the multichannel first time domain data based on the multichannel second time domain data and a second quantity of multiple second antenna weight parameters. The conversion submodule is configured to determine the corresponding Ethernet data based on the multichannel first time domain data.

In this way, for uplink transmission, the data from the antenna module can be converted into time domain data of fewer corresponding antenna channels, to facilitate time domain processing at the second signal processing device.

In some possible implementations, the first processing module is coupled to the interface module, and the interface module is configured to transmit, to the second signal processing device, the Ethernet data determined by the conversion submodule.

In some possible implementations, the conversion submodule is configured to perform packet assembly on data of multiple chips in the multichannel first time domain data, to obtain Ethernet data.

In this way, the Ethernet data can be obtained by performing packet assembly on the multiple chips in the time domain data. In this manner, conversion from the time domain data to the Ethernet data is implemented, so that correct transmission of data through an optical fiber is ensured.

In some possible implementations, a quantity of the multiple chips is determined based on at least one of the following factors: the first quantity, a quantity of sampling points of at least one of the multiple chips, a bit width of the sampling point, or a bandwidth. In this way, various factors can be fully considered during the packet assembly, a transmission bandwidth is fully utilized, transmission efficiency is higher, and a waste of bandwidth resources is avoided.

In some possible implementations, the interface module is further configured to obtain at least one of the following from the second signal processing device: the first quantity, the second quantity, the second quantity of multiple first antenna weight parameters, or the second quantity of multiple second antenna weight parameters. In this way, information synchronization between the first signal processing device and the second signal processing device can be implemented, and consistency of data processing can be ensured.

In some possible implementations, transmission configuration information includes indication information indicating whether processing is performed by the first processing module. In this way, a configuration manner can be simplified, and transmission overheads of the configuration information can be reduced.

In some possible implementations, the transmission configuration information includes first indication information and second indication information, the first indication information indicates a correspondence between the first frequency band range and the first processing module, and the second indication information indicates a correspondence between the second frequency band range and the second processing module.

In this way, it can be ensured that the first processing module and the second processing module respectively process different frequency band ranges, to ensure correct data processing. In this manner, the first signal processing device can simultaneously support the first frequency band range and the second frequency band range, to avoid deploying different devices for different frequency band ranges respectively, and reduce hardware costs.

In some possible implementations, the scheduling module is configured to: if the to-be-processed data is in the first frequency band range, schedule the to-be-processed data to the first processing module; or if the to-be-processed data is in the second frequency band range, schedule the to-be-processed data to the second processing module. In this way, the scheduling module can schedule the data based on the frequency band range, to ensure that the first processing module and the second processing module can process data in a corresponding frequency band range, and ensure correct data processing. In this way, different carriers can be transmitted through a same optical fiber, and distribution and scheduling to two different processing modules can be implemented by the scheduling module.

In some possible implementations, the second splitting mode is a splitting mode inside a physical layer. Optionally, the splitting mode inside the physical layer may indicate that data at a low physical layer is processed by the second processing module of the first signal processing device, and data at a high physical layer is processed by a second baseband module of the second signal processing device.

In some possible implementations, the second processing module is coupled to the interface module, the scheduling module, and the antenna module.

In some possible implementations, the optical fiber is an enhanced common public radio interface (eCPRI) optical fiber.

According to a second aspect of this disclosure, a second signal processing device is provided. The second signal processing device includes: a first baseband module, configured to generate time domain data, where a quantity of antenna channels corresponding to the time domain data is a first quantity; a conversion module, configured to convert the time domain data into first Ethernet data; and an interface module, configured to transmit the first Ethernet data to a first signal processing device through an optical fiber.

In this way, the second signal processing device can convert generated time domain data into Ethernet data for transmission, so that correct transmission through the optical fiber can be determined, and air interface efficiency is improved.

In some possible implementations, the conversion module is coupled to the first baseband module and the interface module.

In some possible implementations, the conversion module is configured to perform packet assembly on data of multiple chips in the time domain data, to obtain the first Ethernet data.

In some possible implementations, a quantity of the multiple chips is determined based on at least one of the following factors: the first quantity, a quantity of sampling points of at least one of the multiple chips, a bit width of the sampling point, or a bandwidth.

In some possible implementations, a second baseband module is further included and configured to generate second Ethernet data. The interface module is further configured to transmit the second Ethernet data to the first signal interface device.

In some possible implementations, a scheduling module is further included. The interface module is further configured to receive Ethernet data from the first signal processing device. The scheduling module is configured to schedule the Ethernet data to the conversion module or the second baseband module. The conversion module is configured to convert the Ethernet data scheduled by the scheduling module into the corresponding time domain data, where the quantity of antenna channels corresponding to the corresponding time domain data is the first quantity. The first baseband module is configured to process the corresponding time domain data. The second baseband module is configured to process the Ethernet data scheduled by the scheduling module. In this way, uplink data can be scheduled to a correct baseband module for processing.

In some possible implementations, the conversion module is configured to determine the corresponding time domain data based on splitting of a payload of the Ethernet data.

In some possible implementations, the scheduling module is coupled to the conversion module and the second baseband module.

In some possible implementations, the interface module is further configured to send transmission configuration information to the first signal processing device.

In some possible implementations, the transmission configuration information includes indication information indicating whether processing is performed by a first processing module of the first signal processing device.

In some possible implementations, the transmission configuration information includes first indication information and second indication information, the first indication information indicates a correspondence between a first frequency band range and a first processing module of the first signal processing device, and the second indication information indicates a correspondence between a second frequency band range and a second processing module of the first signal processing device.

In some possible implementations, the interface module is configured to send at least one of the following to the first signal processing device: the first quantity, a second quantity, a second quantity of multiple first antenna weight parameters, or a second quantity of multiple second antenna weight parameters, where the second quantity represents a quantity of antenna channels through which an antenna module of the first signal processing device receives and transmits data.

In some possible implementations, the optical fiber is an enhanced common public radio interface eCPRI optical fiber.

According to a third aspect of this disclosure, a communication system is provided, and includes the first signal processing device according to the first aspect or any embodiment and the second signal processing device according to the second aspect or any embodiment, where the first signal processing device and the second signal processing device are connected through an optical fiber. Optionally, the optical fiber is an eCPRI optical fiber.

According to a fourth aspect of this disclosure, a data transmission method is provided. The method includes: obtaining to-be-processed data; scheduling the to-be-processed data to a first processing module or a second processing module based on transmission configuration information from a second signal processing device, where the to-be-processed data includes Ethernet data from the second signal processing device or uplink data from an antenna module; processing, by the first processing module, the scheduled data according to a first splitting mode; and processing, by the second processing module, the scheduled data according to a second splitting mode.

In some possible implementations, the first splitting mode is a time domain splitting mode, and the processing, by the first processing module, the scheduled data according to a first splitting mode includes: performing, by the first processing module, RF processing on the scheduled data.

In some possible implementations, the to-be-processed data includes the Ethernet data from the second signal processing device, a quantity of antenna channels corresponding to the Ethernet data is a first quantity, and the processing, by the first processing module, the scheduled data according to a first splitting mode includes: determining corresponding multichannel first time domain data based on the Ethernet data; and determining multichannel second time domain data based on the multichannel first time domain data and a second quantity of multiple first antenna weight parameters, where the second quantity corresponds to a quantity of antenna channels of the antenna module, and the first quantity is less than the second quantity.

In some possible implementations, the method further includes: sending the multichannel second time domain data through the multiple antenna channels of the antenna module.

In some possible implementations, the determining corresponding multichannel first time domain data based on the Ethernet data includes: determining the multichannel first time domain data based on splitting of a payload of the Ethernet data.

In some possible implementations, the to-be-processed data includes the uplink data from the antenna module, the uplink data includes a second quantity of multichannel second time domain data, and the processing, by the first processing module, the scheduled data according to a first splitting mode includes: determining multichannel first time domain data based on the multichannel second time domain data and a second quantity of multiple second antenna weight parameters; and determining the corresponding Ethernet data based on the multichannel first time domain data.

In some possible implementations, the method further includes: transmitting the determined Ethernet data to the second signal processing device.

In some possible implementations, the determining the corresponding Ethernet data based on the multichannel first time domain data includes: performing packet assembly on data of multiple chips in the multichannel first time domain data, to obtain the Ethernet data.

In some possible implementations, a quantity of the multiple chips is determined based on at least one of the following factors: a first quantity, a quantity of sampling points of at least one of the multiple chips, a bit width of the sampling point, or a bandwidth.

In some possible implementations, the method further includes: obtaining at least one of the following from the second signal processing device: the first quantity, the second quantity, the second quantity of multiple first antenna weight parameters, or the second quantity of multiple second antenna weight parameters.

In some possible implementations, transmission configuration information includes indication information indicating whether processing is performed by the first processing module.

In some possible implementations, the transmission configuration information includes first indication information and second indication information, the first indication information indicates a correspondence between a first frequency band range and the first processing module, and the second indication information indicates a correspondence between a second frequency band range and the second processing module.

In some possible implementations, the scheduling the to-be-processed data to a first processing module or a second processing module based on transmission configuration information from a second signal processing device includes: if the to-be-processed data is in the first frequency band range, scheduling the to-be-processed data to the first processing module; or if the to-be-processed data is in the second frequency band range, scheduling the to-be-processed data to the second processing module.

In some possible implementations, the second splitting mode is a splitting mode inside a physical layer. According to some embodiments of the fourth aspect, an optical fiber is an eCPRI optical fiber.

According to a fifth aspect of this disclosure, a data processing method is provided. The method includes: A first baseband module generates time domain data, where a quantity of antenna channels corresponding to the time domain data is a first quantity; converts the time domain data into first Ethernet data; and transmits the first Ethernet data to a first signal processing device through an optical fiber.

In some possible implementations, the converting the time domain data into first Ethernet data includes: performing packet assembly on data of multiple chips in the time domain data, to obtain the first Ethernet data.

In some possible implementations, a quantity of the multiple chips is determined based on at least one of the following factors: the first quantity, a quantity of sampling points of at least one of the multiple chips, a bit width of the sampling point, or a bandwidth.

In some possible implementations, the method further includes: A second baseband module generates second Ethernet data; and transmits second Ethernet data to the first signal processing device through the optical fiber.

In some possible implementations, the method further includes: receiving Ethernet data from the first signal processing device through the optical fiber; scheduling the Ethernet data to a conversion module or the second baseband module; converting, by the conversion module, the scheduled Ethernet data into the corresponding time domain data, where a quantity of antenna channels corresponding to the corresponding time domain data is the first quantity; processing, by the first baseband module, the corresponding time domain data; and processing, by the second baseband module, the scheduled Ethernet data.

In some possible implementations, the converting the Ethernet data into the corresponding time domain data includes: determining the corresponding time domain data based on splitting of a payload of the Ethernet data.

In some possible implementations, the method further includes: sending transmission configuration information to the first signal processing device.

In some possible implementations, transmission configuration information includes indication information indicating whether processing is performed by a first processing module of the first signal processing device.

In some possible implementations, transmission configuration information includes first indication information and second indication information, the first indication information indicates a correspondence between a first frequency band range and the first processing module of the first signal processing device, and the second indication information indicates a correspondence between a second frequency band range and a second processing module of the first signal processing device.

In some possible implementations, the method further includes: sending at least one of the following to the first signal processing device: the first quantity, a second quantity, a second quantity of multiple first antenna weight parameters, or a second quantity of multiple second antenna weight parameters, where the second quantity represents a quantity of antenna channels through which an antenna module of the first signal processing device receives and transmits data.

In some possible implementations, the optical fiber is an eCPRI optical fiber.

According to a sixth aspect of this disclosure, a communication apparatus is provided. The communication apparatus includes a processor and a memory. The memory stores instructions executed by the processor. When the instructions are executed by the processor, the communication apparatus is enabled to implement: obtaining to-be-processed data; scheduling the to-be-processed data to a first processing module or a second processing module based on transmission configuration information from a second signal processing device, where the to-be-processed data includes Ethernet data from the second signal processing device or uplink data from an antenna module; processing, by the first processing module, the scheduled data according to a first splitting mode; and processing, by the second processing module, the scheduled data according to a second splitting mode.

In some possible implementations, the first splitting mode is a time domain splitting mode, and when the instructions are executed by the processor, the communication apparatus is enabled to implement: performing RF processing on the scheduled data by the first processing module.

In some possible implementations, the to-be-processed data includes the Ethernet data from the second signal processing device, and a quantity of antenna channels corresponding to the Ethernet data is a first quantity. When the instructions are executed by the processor, the communication apparatus is enabled to implement: determining corresponding multichannel first time domain data based on the Ethernet data; and determining multichannel second time domain data based on the multichannel first time domain data and a second quantity of multiple first antenna weight parameters, where the second quantity corresponds to a quantity of antenna channels of an antenna module, and the first quantity is less than the second quantity.

In some possible implementations, when the instructions are executed by the processor, the communication apparatus is enabled to implement: sending the multichannel second time domain data through the multiple antenna channels of the antenna module.

In some possible implementations, when the instructions are executed by the processor, the communication apparatus is enabled to implement: determining the multichannel first time domain data based on splitting of a payload of the Ethernet data.

In some possible implementations, the to-be-processed data includes the uplink data from the antenna module, and the uplink data includes a second quantity of multichannel second time domain data. When the instructions are executed by the processor, the communication apparatus is enabled to implement: determining multichannel first time domain data based on the multichannel second time domain data and a second quantity of multiple second antenna weight parameters; and determining the corresponding Ethernet data based on the multichannel first time domain data.

In some possible implementations, when the instructions are executed by the processor, the communication apparatus is enabled to implement: transmitting the determined Ethernet data to the second signal processing device.

In some possible implementations, when the instructions are executed by the processor, the communication apparatus is enabled to implement: performing packet assembly on data of multiple chips in the multichannel first time domain data, to obtain the Ethernet data.

In some possible implementations, a quantity of the multiple chips is determined based on at least one of the following factors: the first quantity, a quantity of sampling points of at least one of the multiple chips, a bit width of the sampling point, or a bandwidth.

In some possible implementations, the following is further included: obtaining at least one of the following from the second signal processing device: the first quantity, the second quantity, the second quantity of multiple first antenna weight parameters, or the second quantity of multiple second antenna weight parameters.

In some possible implementations, the transmission configuration information includes indication information indicating whether processing is performed by the first processing module.

In some possible implementations, the transmission configuration information includes first indication information and second indication information, the first indication information indicates a correspondence between a first frequency band range and the first processing module, and the second indication information indicates a correspondence between a second frequency band range and the second processing module.

In some possible implementations, when the instructions are executed by the processor, the communication apparatus is enabled to implement: if the to-be-processed data is in the first frequency band range, scheduling the to-be-processed data to the first processing module; or if the to-be-processed data is in the second frequency band range, scheduling the to-be-processed data to the second processing module.

In some possible implementations, the second splitting mode is a splitting mode inside a physical layer. According to some embodiments of the sixth aspect, an optical fiber is an eCPRI optical fiber.

According to a seventh aspect of this disclosure, a communication apparatus is provided. The communication apparatus includes a processor and a memory. The memory stores instructions executed by the processor. When the instructions are executed by the processor, the communication apparatus is enabled to implement: A first baseband module generates time domain data, where a quantity of antenna channels corresponding to the time domain data is a first quantity; converts the time domain data into first Ethernet data; and transmits the first Ethernet data to a first signal processing device through an optical fiber.

In some possible implementations, when the instructions are executed by the processor, the communication apparatus is enabled to implement: performing packet assembly on data of multiple chips in the time domain data, to obtain the first Ethernet data.

In some possible implementations, a quantity of the multiple chips is determined based on at least one of the following factors: the first quantity, a quantity of sampling points of at least one of the multiple chips, a bit width of the sampling point, or a bandwidth.

In some possible implementations, when the instructions are executed by the processor, the communication apparatus is enabled to implement: A second baseband module generates second Ethernet data; and transmits the second Ethernet data to the first signal processing device through the optical fiber.

In some possible implementations, when the instructions are executed by the processor, the communication apparatus is enabled to implement: receiving Ethernet data from the first signal processing device through the optical fiber; scheduling the Ethernet data to a conversion module or the second baseband module; converting, by the conversion module, the scheduled Ethernet data into the corresponding time domain data, where the quantity of antenna channels corresponding to the corresponding time domain data is the first quantity; processing, by the first baseband module, the corresponding time domain data; and processing, by the second baseband module, the scheduled Ethernet data.

In some possible implementations, when the instructions are executed by the processor, the communication apparatus is enabled to implement: determining the corresponding time domain data based on splitting of a payload of the Ethernet data.

In some possible implementations, when the instructions are executed by the processor, the communication apparatus is enabled to implement: sending transmission configuration information to the first signal processing device.

In some possible implementations, the transmission configuration information includes indication information indicating whether processing is performed by a first processing module of the first signal processing device.

In some possible implementations, the transmission configuration information includes first indication information and second indication information, the first indication information indicates a correspondence between a first frequency band range and the first processing module of the first signal processing device, and the second indication information indicates a correspondence between a second frequency band range and a second processing module of the first signal processing device.

In some possible implementations, when the instructions are executed by the processor, the communication apparatus is enabled to implement: sending at least one of the following to the first signal processing device: the first quantity, a second quantity, a second quantity of multiple first antenna weight parameters, or a second quantity of multiple second antenna weight parameters, where the second quantity represents a quantity of antenna channels through which an antenna module of the first signal processing device receives and transmits data.

In some possible implementations, the optical fiber is an eCPRI optical fiber.

According to an eighth aspect of this disclosure, a computer-readable storage medium is provided. The computer-readable storage medium stores computer-executable instructions. When the computer-executable instructions are executed by a processor, an operation of the method according to the fourth aspect or any embodiment of the fourth aspect is implemented, or an operation of the method according to the fifth aspect or any embodiment of the fifth aspect is implemented.

According to a ninth aspect of this disclosure, a chip or a chip system is provided. The chip or the chip system includes a processing circuit configured to perform an operation of the method according to the fourth aspect or any embodiment of the fourth aspect, or implement an operation of the method according to the fifth aspect or any embodiment of the fifth aspect.

According to a tenth aspect of this disclosure, a computer program or a computer program product is provided. The computer program or the computer program product is tangibly stored in a computer-readable medium and includes computer-executable instructions. When the computer-executable instructions are executed, an operation of the method according to the fourth aspect or any embodiment of the fourth aspect is implemented, or an operation of the method according to the fifth aspect or any embodiment of the fifth aspect is implemented.

BRIEF DESCRIPTION OF THE DRAWINGS

The foregoing and other features, advantages, and aspects of embodiments of this disclosure become clearer with reference to the accompanying drawings and the following detailed descriptions. In the accompanying drawings, same or similar reference numerals represent same or similar elements.

DETAILED DESCRIPTION OF ILLUSTRATIVE EMBODIMENTS

Figures 1, 2:
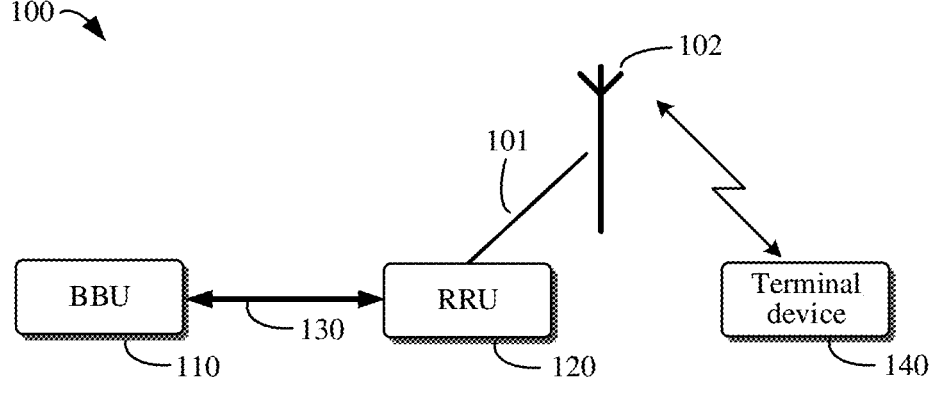
FIG. 1 is a schematic block diagram of a distributed access network device.
FIG. 2 is another schematic block diagram of a distributed access network device.

The following describes embodiments of this disclosure in more detail with reference to accompanying drawings. Although some embodiments of this disclosure are shown in the accompanying drawings, it should be understood that this disclosure may be implemented in various forms and should not be construed as being limited to the embodiments described herein. On the contrary, these embodiments are provided for a more thorough and complete understanding of this disclosure. It should be understood that the accompanying drawings and embodiments of this disclosure are merely used as an example, but are not intended to limit the protection scope of this disclosure.

In the descriptions of embodiments of this disclosure, the term "include" and similar terms thereof should be understood as an open inclusion, that is, "include but not limited to". The term "based on" should be understood as "at least partially based on". The term "an embodiment" or "the embodiment" should be understood as "at least one embodiment". The terms "first", "second", and the like may refer to different or same objects. Other explicit and implicit definitions may also be included below.

Embodiments of this disclosure may be implemented according to any appropriate communication protocol, including but not limited to a cellular communication protocol such as 3rd generation (3rd Generation, 3G), 4th generation (4G), 5th generation (5G), or 6th generation (6G), a wireless local area network communication protocol such as the Institute of Electrical and Electronics Engineers (IEEE) 802.11, and/or any other protocol currently known or developed in the future.

The technical solutions according to embodiments of this disclosure are applied to a communication system that complies with the any appropriate communication protocol, for example, a general packet radio service (GPRS) system, a global system for mobile communications (GSM), an enhanced data rate for GSM evolution system (EDGE), a universal mobile telecommunications system (UMTS), a long term evolution (LTE) system, a wideband code division multiple access (WCDMA) system, a code division multiple access 2000 (CDMA2000) system, a time division-synchronous code division multiple access (TD-SCDMA) system, a frequency division duplex (FDD) system, a time division duplex (TDD) system, a 5th generation system or a new radio (NR) system, or a future evolved 6th generation communication system.

It should be understood that embodiments of this disclosure are not limited to a specific communication system, but may be applied to any communication system that has a similar problem, for example, a wireless local area network (WLAN), a wired communication system, or another communication system developed in the future.

In this disclosure, the term "terminal device" is any terminal device that can perform wired or wireless communication with a network device or between terminal devices. The terminal device may sometimes be referred to as user equipment (UE). The terminal device may be a mobile terminal, a fixed terminal, or a portable terminal of any type. For example, the terminal device may include a mobile phone, a station, a unit, a device, a mobile terminal (MT), a subscription station, a portable subscription station, an internet node, a communicator, a desktop computer, a laptop computer, a notebook computer, a tablet computer, a personal communication system device, a personal navigation device, a personal digital assistant (PDA), a positioning device, a radio broadcast receiver, an e-book device, a game device, an internet of things (IoT) device, a vehicle-mounted device, an aircraft, a virtual reality (VR) device, an augmented reality (AR) device, a wearable device, a terminal device in a 5G network, any terminal device in an evolved public land mobile network (PLMN), another device that can be used for communication, or any combination thereof. This is not limited in embodiments of this disclosure.

The term "network device" in this disclosure is an entity or a node, for example, may be an access network device that may be configured to communicate with a terminal device. The access network device may be an apparatus, for example, may be a radio access network (RAN) network device that is deployed in a radio access network to provide a wireless communication function for the mobile terminal. The access network device may include various types of base stations. For example, the access network device may include various forms of macro base stations, micro base stations, pico base stations, femto base stations, relay stations, access points, remote radio units (RRUs), radio heads (RHs), remote radio heads (RRHs), and the like. In systems using different radio access technologies, names of access network devices may be different. For example, an access network device is referred to as an evolved NodeB (eNB or eNodeB) in a long term evolution (LTE) network, is referred to as a NodeB (NB) in a 3G network, and may be referred to as a gNodeB (gNB) or an NR NodeB (NR NB) in a 5G network. In some scenarios, the access network device may include a central unit (CU) and/or a distributed unit (DU). The CU and the DU maybe placed in different places. For example, the DU is remote and placed in an area of a high traffic volume, and the CU is placed in a central equipment room. Alternatively, the CU and the DU maybe placed in a same equipment room. The CU and the DU may alternatively be different components in a rack. For ease of description, in subsequent embodiments of this disclosure, the foregoing apparatuses that provide a wireless communication function for the terminal device are collectively referred to as network devices. This is not specifically limited in embodiments of this disclosure.

A distributed access network device is a main form of an access network device in a current cellular wireless communication system.

FIG. 1 is a schematic block diagram of a distributed access network device 100. In FIG. 1, the distributed access network device 100 includes a BBU 110 and an RRU 120, which are connected through an optical fiber 130. The RRU 120 may be connected to an antenna 102 through a feeder 101, to be capable of communicating with a terminal device 140.

The optical fiber 130 in FIG. 1 maybe a cable according to the common public radio interface (CPRI) protocol. The CPRI protocol is one of current standard radio interface protocols used for connecting the BBU and the RRU. In addition, in the CPRI protocol, the BBU is also referred to as radio equipment control (REC), and the RRU is also referred to as radio equipment (RE).

The RRU 120 may include four modules: a digital intermediate frequency module, a transceiver module, a power amplification module, and a filtering module. Downlink transmission from the distributed access network device 100 to the terminal device 140 is used as an example. The digital intermediate frequency module may be configured to perform modulation and demodulation, digital up-conversion and down-conversion, analog/digital (A/D) conversion, and the like during optical transmission. The transceiver module is configured to implement conversion from an intermediate frequency signal to a radio frequency signal. The converted radio frequency signal may then pass through the power amplification module and the filtering module, and be transmitted to the terminal device 140 through the antenna 102.

In the distributed access network device 100 shown in FIG. 1, a time domain splitting mode is used. In other words, the BBU 110 completes processing at a media access control (MAC) layer, a physical layer, and the like, and the RRU 120 completes radio frequency (RF) processing. In addition, a carrier supported by the RRU 120 is in a first frequency band range, for example, a 1.8 GHz frequency band.

FIG. 2 is another schematic block diagram of a distributed access network device 200. In FIG. 2, the distributed access network device 200 includes a BBU 210 and an AAU 220, which are connected through an optical fiber 230. The AAU 220 includes an antenna module, and therefore, can communicate with a terminal device 240. Optionally, the BBU 210 may include a CU and a DU, which are not shown in FIG. 2.

The optical fiber 230 maybe a cable according to the enhanced common public radio interface (eCPRI) protocol. The distributed access network device 200 shown in FIG. 2 can support massive multiple input multiple output (Massive MIMO) and use a splitting mode inside a physical layer. In other words, the BBU 210 completes processing at a MAC layer, a high physical layer, and the like, and the AAU 220 completes processing at a low physical layer and RF processing. In addition, a carrier supported by the AAU 220 is in a second frequency band range, for example, a 2.1 GHz frequency band.

Figure 3:
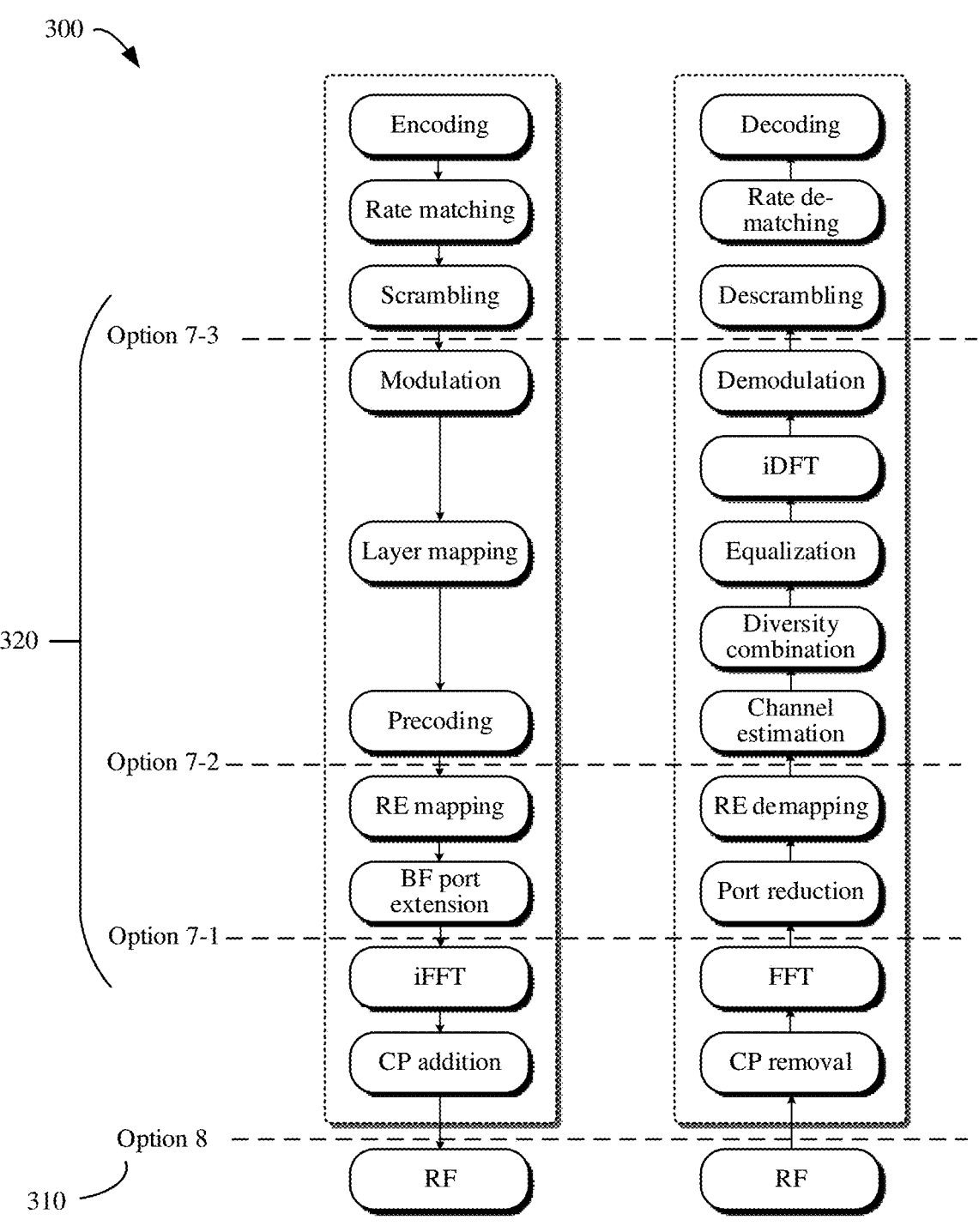
FIG. 3 is a schematic diagram of different splitting modes.

FIG. 3 is a schematic diagram of different splitting modes 300. FIG. 3 shows a time domain splitting mode 310, for example, option 8, and further shows a splitting mode 320 inside a physical layer, for example, option 7-1, option 7-2, and option 7-3.

With reference to FIG. 3, option 7-1 is used as an example: For downlink transmission, a BBU performs coding, rate matching, scrambling, modulation, layer mapping, precoding, resource element (RE) mapping, beamforming (BF) port extension, and the like at a high physical layer, and an AAU performs inverse fast Fourier transform (iFFT), cyclic shift (CP) addition, and the like at a low physical layer. For uplink transmission, the AAU performs CP removal and fast Fourier transform (FFT) at the low physical layer, and the BBU performs port reduction, RE demapping, channel estimation, diversity combination, equalization, inverse discrete Fourier transform (iDFT), demodulation, descrambling, rate de-matching, decoding, and the like at the high physical layer. Option 7-2 and option 7-3 may be described with reference to FIG. 3, and are not listed in this disclosure.

For example, for option 7-1, option 7-2, and option 7-3, refer to descriptions in section 4.2 in 3GPP TS 38.816 (for example, 15.0.0), and for option 8, refer to descriptions in section 11.1.2.8 in 3GPP TS 38.801 (for example, 14.0.0). However, it should be noted that the splitting manner shown in FIG. 3 is merely an example, and cannot be construed as a limitation on embodiments of this disclosure.

It may be understood that the splitting mode in this disclosure may also be referred to as a splitting manner, a protocol splitting mode, or the like. In some scenarios, the splitting mode may represent splitting into an RRU and a BBU or an AAU and a BBU. For example, when the BBU includes a CU and a DU, the splitting manner may represent splitting into the AAU and the DU.

As described above, the RRU is connected to the BBU through a CPRI interface and supports a first frequency band range. The AAU is connected to the BBU through an eCPRI interface and supports a second frequency band range. To meet requirements of different services, an operator needs to provide an access network device that simultaneously supports the first frequency band range and the second frequency band range. A manner of separately deploying the RRU and the BBU not only has a complex structure, but also causes high costs.

For the foregoing problem and another potential problem in a similar scenario, an embodiment of this disclosure provides a signal processing device. The signal processing device maybe connected to a second signal processing device through an optical fiber, and supports two different splitting modes, that is, can simultaneously support the first frequency band range and the second frequency band range. In this way, hardware complexity of a device can be reduced, and installation costs can be reduced. The following describes embodiments according to this disclosure in detail with reference to FIG. 4 to FIG. 11. It may be understood that embodiments of this disclosure are not limited to the scenario of the BBU and the RRU and the scenario of the BBU and the AAU, and may be further applicable to another scenario.

Figure 4:
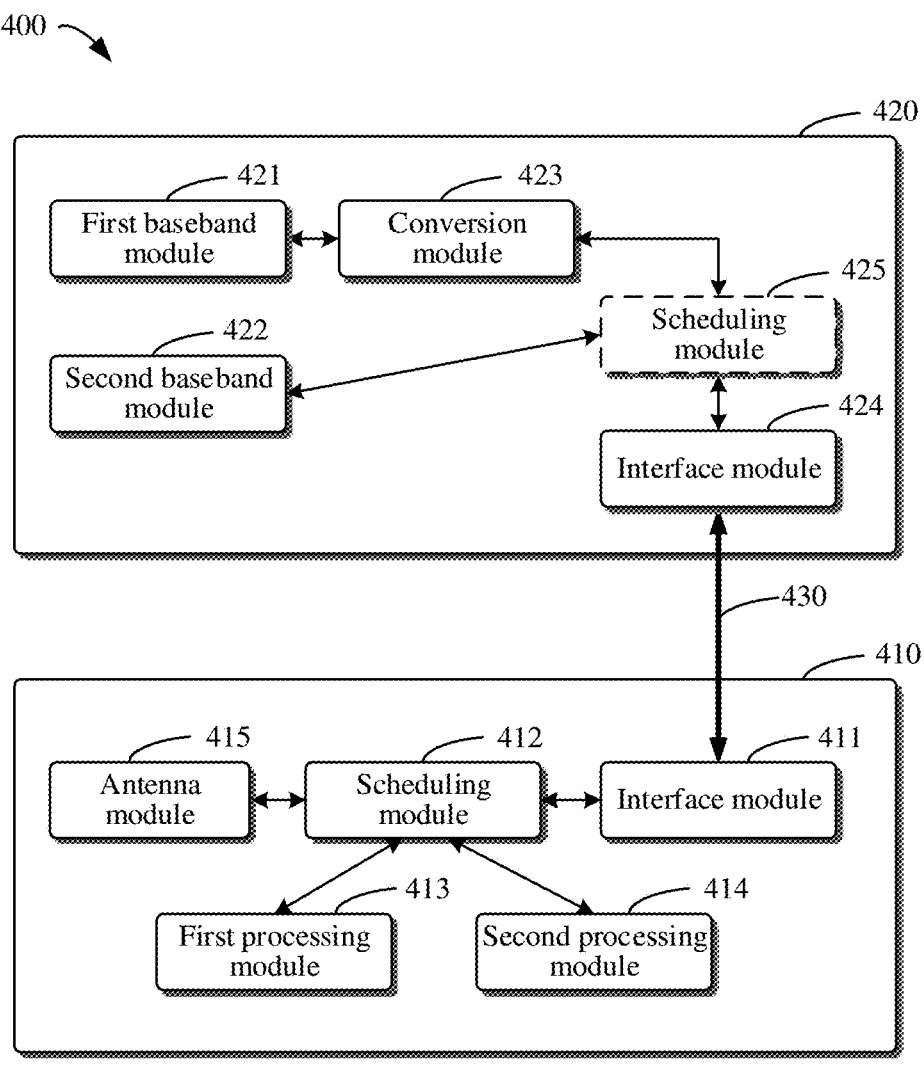
FIG. 4 is a schematic block diagram of an access network device according to an embodiment of this disclosure.

FIG. 4 is a schematic block diagram of an access network device 400 according to an embodiment of this disclosure. The access network device 400 includes a first signal processing device 410 and a second signal processing device 420, and the first signal processing device 410 is connected to the second signal processing device 420 through an optical fiber 430.

In some embodiments, the first signal processing device 410 may be installed outdoors, for example, on a pole, and the second signal processing device 420 may be installed inside a building. Optionally, the optical fiber 430 maybe an optical cable of the eCPRI protocol. Correspondingly, the first signal processing device 410 may include a first eCPRI interface, and the second signal processing device 420 may include a second eCPRI interface. The first signal processing device 410 and the second signal processing device 420 may transmit Ethernet data to each other. For example, for downlink transmission, the second signal processing device 420 transmits downlink Ethernet data to the first signal processing device 410. For example, for uplink transmission, the first signal processing device 410 transmits uplink Ethernet data to the second signal processing device 420.

As shown in FIG. 4, the first signal processing device 410 may include an interface module 411, a scheduling module 412, a first processing module 413, a second processing module 414, and an antenna module 415. The interface module 411 is connected to the scheduling module 412, the scheduling module 412 is connected to the first processing module 413 and the second processing module 414, and the scheduling module 412 is further connected to the antenna module 415. The interface module 411 may be configured to perform Ethernet data transmission with the second signal processing device 420 through the optical fiber 430. The scheduling module 412 maybe configured to schedule to-be-processed data to the first processing module 413 or the second processing module 414 based on transmission configuration information from the second signal processing device 420. The first processing module 413 may be configured to process the data from the scheduling module 412 according to a first splitting mode. The second processing module 414 may be configured to process the data from the scheduling module 412 according to a second splitting mode. The antenna module 415 may be configured to send downlink data and/or receive uplink data, where the downlink data is processed data of the first processing module 413 or the second processing module 414. Specifically, the to-be-processed data scheduled by the scheduling module 412 may be Ethernet data from the interface module 411, or may be uplink data from the antenna module 415.

Figure 5:
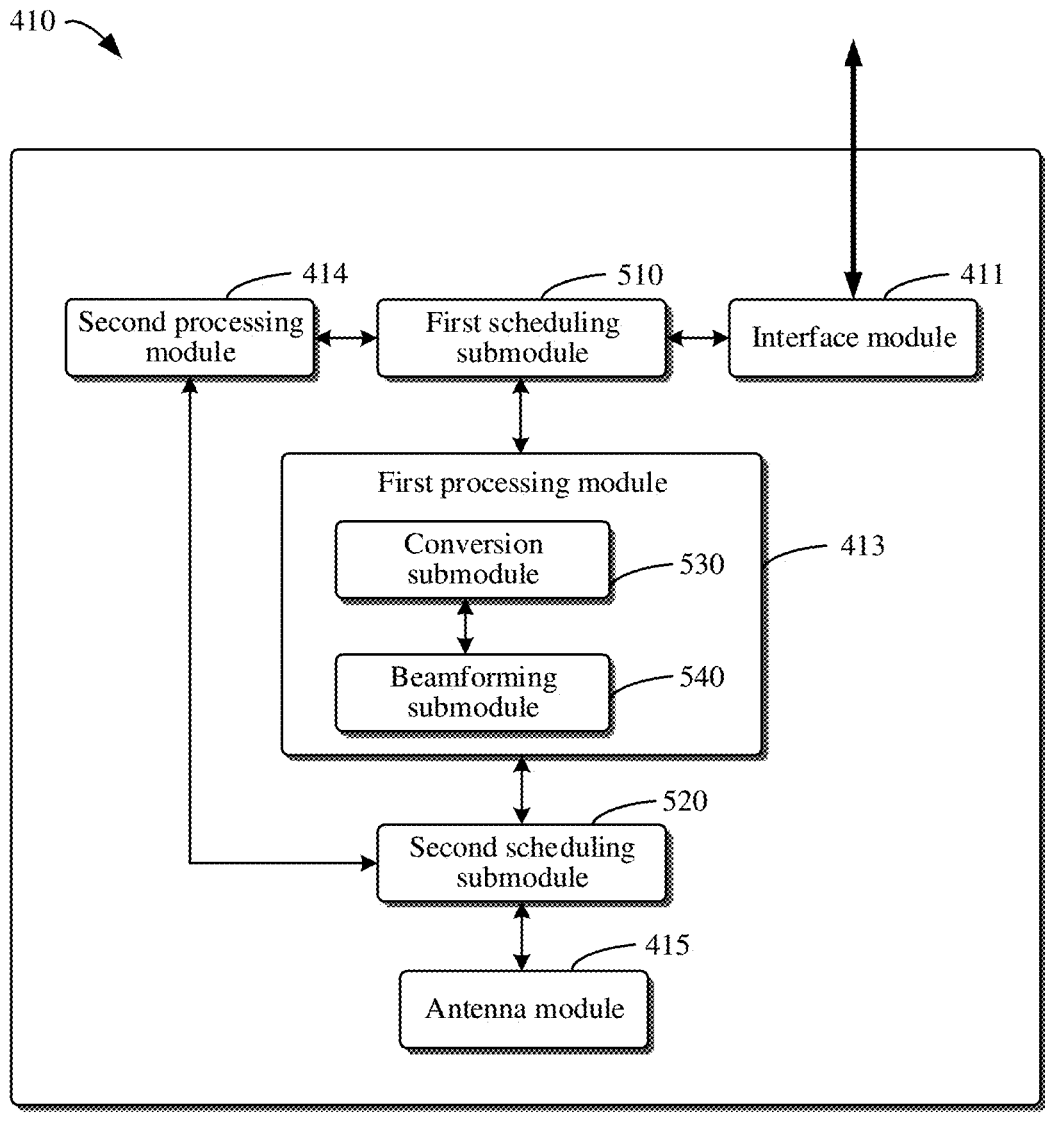
FIG. 5 is a schematic block diagram of a first signal processing device according to some embodiments of this disclosure.

In some embodiments of this disclosure, the scheduling module 412 may include a first scheduling submodule and a second scheduling submodule. FIG. 5 is another schematic block diagram of a first signal processing device 410 according to some embodiments of this disclosure. As shown in FIG. 5, an interface module 411 is connected to a first scheduling submodule 510, and the first scheduling submodule 510 is connected to a first processing module 413 and a second processing module 414. An antenna module 415 is connected to a second scheduling submodule 520, and the second scheduling submodule 520 is connected to the first processing module 413 and the second processing module 414.

The first scheduling submodule 510 may be configured to schedule Ethernet data from the interface module 411 to the first processing module 413 or the second processing module 414 based on transmission configuration information from a second signal processing device 420. The second scheduling submodule 520 may be configured to schedule uplink data from the antenna module 415 to the first processing module 413 or the second processing module 414 based on the transmission configuration information from the second signal processing device 420. Optionally, the first scheduling submodule 510 may be further configured to transmit processed data of the first processing module 413 or the second processing module 414 to the interface module 411. The second scheduling submodule 520 may be further configured to transmit the processed data of the first processing module 413 or the second processing module 414 to the antenna module 415.

As shown in FIG. 5, the first processing module 413 may include a conversion submodule 530 and a beamforming submodule 540, and the conversion submodule 530 is connected to the beamforming submodule 540. The conversion submodule 530 may be configured to implement conversion between Ethernet data and time domain data. The beamforming submodule 540 may be configured to implement conversion between a first quantity of multichannel first time domain data and a second quantity of multichannel second time domain data. The first quantity is less than the second quantity. For example, the first quantity may be any one of 1, 2, 4, or 8, and the second quantity may be any one of 32, 64, or 128. However, it should be noted that listed values of the first quantity and the second quantity in this disclosure are merely examples, and should not be construed as a limitation on embodiments of this disclosure.

It may be understood that in some examples, the conversion submodule 530 that implements a conversion function may also be referred to as a data bridge (bridge) or another name. This is not limited in this disclosure. In embodiments of this disclosure, the scheduling module 412 may be configured by a control plane (not shown in the figure) of the first signal processing device 410, for example, may be configured according to splitting modes corresponding to different carriers.

In some embodiments of this disclosure, the first signal processing device 410 may be obtained by upgrading and reconstructing the AAU 220 shown in FIG. 2. For example, based on the AAU 220 shown in FIG. 2, the AAU 220 is upgraded to the first signal processing device 410 by adding the scheduling module 412 and the first processing module 413. In this way, existing devices can be fully utilized, so that large-scale device replacement can be avoided, and costs can be further reduced.

As shown in FIG. 4, the second signal processing device 420 may include a first baseband module 421, a second baseband module 422, a conversion module 423, and an interface module 424. The first baseband module 421 is connected to the conversion module 423, and the conversion module 423 and the second baseband module 422 are connected to the interface module 424. The first baseband module 421 may be configured to generate or process time domain data. The second baseband module 422 may be configured to generate or process Ethernet data. The conversion module 423 may be configured to implement conversion between the time domain data and the Ethernet data. The interface module 424 may be configured to perform Ethernet data transmission with the first signal processing device 410 through the optical fiber 430. Specifically, the conversion module 423 may convert time domain data from the first baseband module 421 into Ethernet data, and may convert Ethernet data from the interface module 424 into time domain data.

Optionally, the second signal processing device 420 may further include a scheduling module 425. The scheduling module 425 maybe connected to the conversion module 423 and the second baseband module 422, and the scheduling module 425 may also be connected to the interface module 424. The scheduling module 425 maybe configured to schedule the Ethernet data from the interface module 424 to the conversion module 423 or the second baseband module 422. Correspondingly, the conversion module 423 may convert the Ethernet data from the scheduling module 425 into the time domain data, and then provide the converted time domain data to the first baseband module 421.

It may be understood that, in some examples, the conversion module 423 that implements a conversion function may also be referred to as a data bridge or another name. This is not limited in this disclosure. In some examples, it may be understood that the scheduling module 425 can implement an Ethernet data distribution function, and correspondingly, the scheduling module 425 may also be referred to as a distribution module. This is not limited in this disclosure.

In some embodiments of this disclosure, the second signal processing device 420 may be obtained by upgrading and reconstructing the BBU 110 shown in FIG. 1 or the BBU 210 shown in FIG. 2. For example, based on the BBU 110 shown in FIG. 1, the BBU 110 is upgraded to the second signal processing device 420 by adding the second baseband module 422 and the conversion module 423, and replacing an original CPRI interface with an eCPRI interface. Based on the BBU 210 shown in FIG. 2, the BBU 210 is upgraded to the second signal processing device 420 by adding the second baseband module 422 and the conversion module 423. In this way, existing devices can be fully utilized, so that large-scale device replacement can be avoided, and costs can be further reduced.

Transmission that is transmitted through the antenna module 415 of the first signal processing device 410 and that is from the second signal processing device 420 to the first signal processing device 410 is referred to as downlink transmission. Transmission that is received by the antenna module 415 of the first signal processing device 410 and that is from the first signal processing device 410 to the second signal processing device 420 is referred to as uplink transmission.

It should be noted that although FIG. 4 and FIG. 5 show that the first signal processing device 410 includes multiple modules and the second signal processing device 420 includes multiple modules, the modules in FIG. 4 or FIG. 5 are merely examples. In an actual scenario, the first signal processing device 410 and the second signal processing device 420 may include fewer or more modules. For example, the antenna module 415 may be independent of the first signal processing device 410, in other words, the first signal processing device 410 may not include the antenna module 415, and so on. This is not listed in this disclosure.

It should be understood that division into the modules or the units in embodiments of this disclosure is an example, and is merely logical function division. During actual implementation, there maybe another division manner. In addition, functional units in embodiments of this disclosure maybe integrated into one unit, or each of the functional units may exist alone physically, or two or more units may be integrated into one unit. The integrated unit may be implemented in a form of hardware, or may be implemented in a form of a software functional unit.

Figure 6:
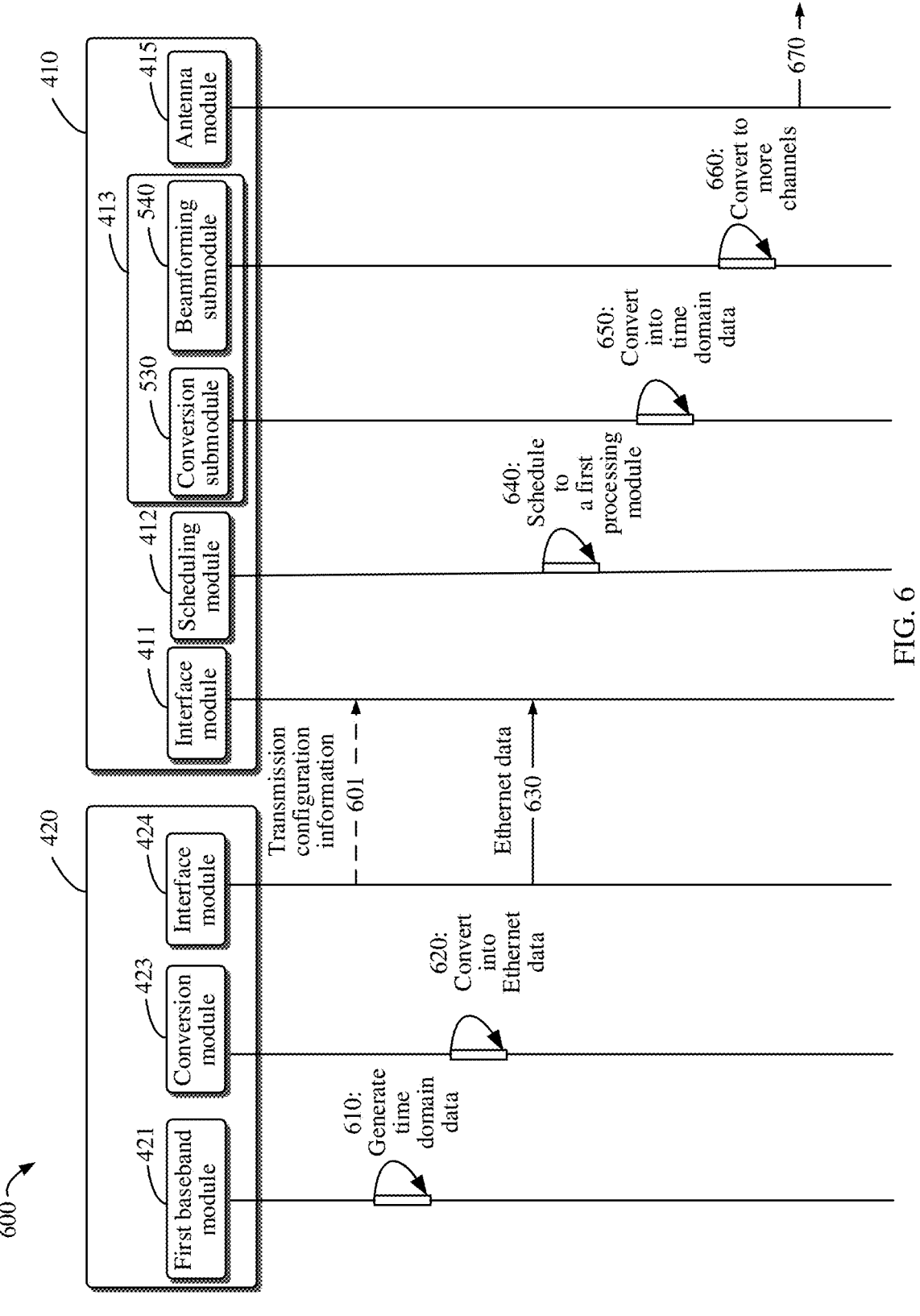
FIG. 6 is a signaling interaction diagram of a data transmission process according to some embodiments of this disclosure.
Figure 7:
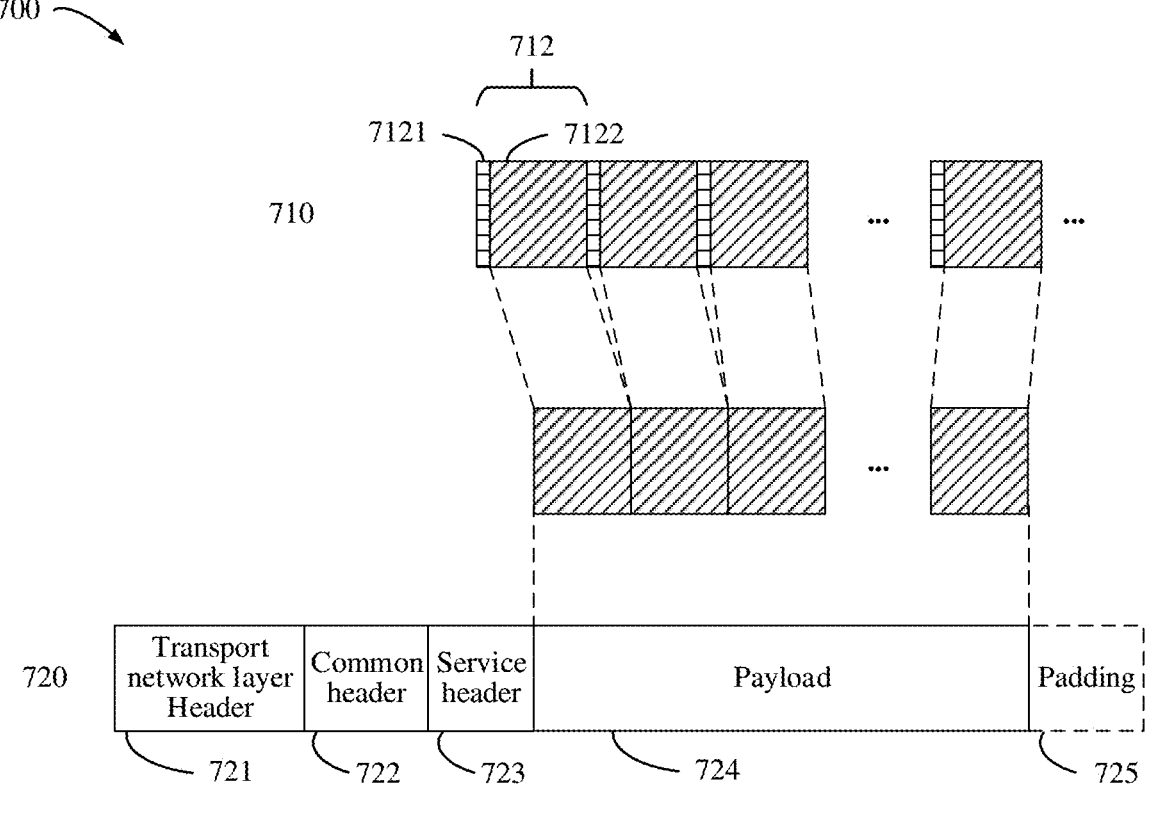
FIG. 7 is a schematic diagram of a case in which time domain data is converted into Ethernet data according to some embodiments of this disclosure.
Figure 8:
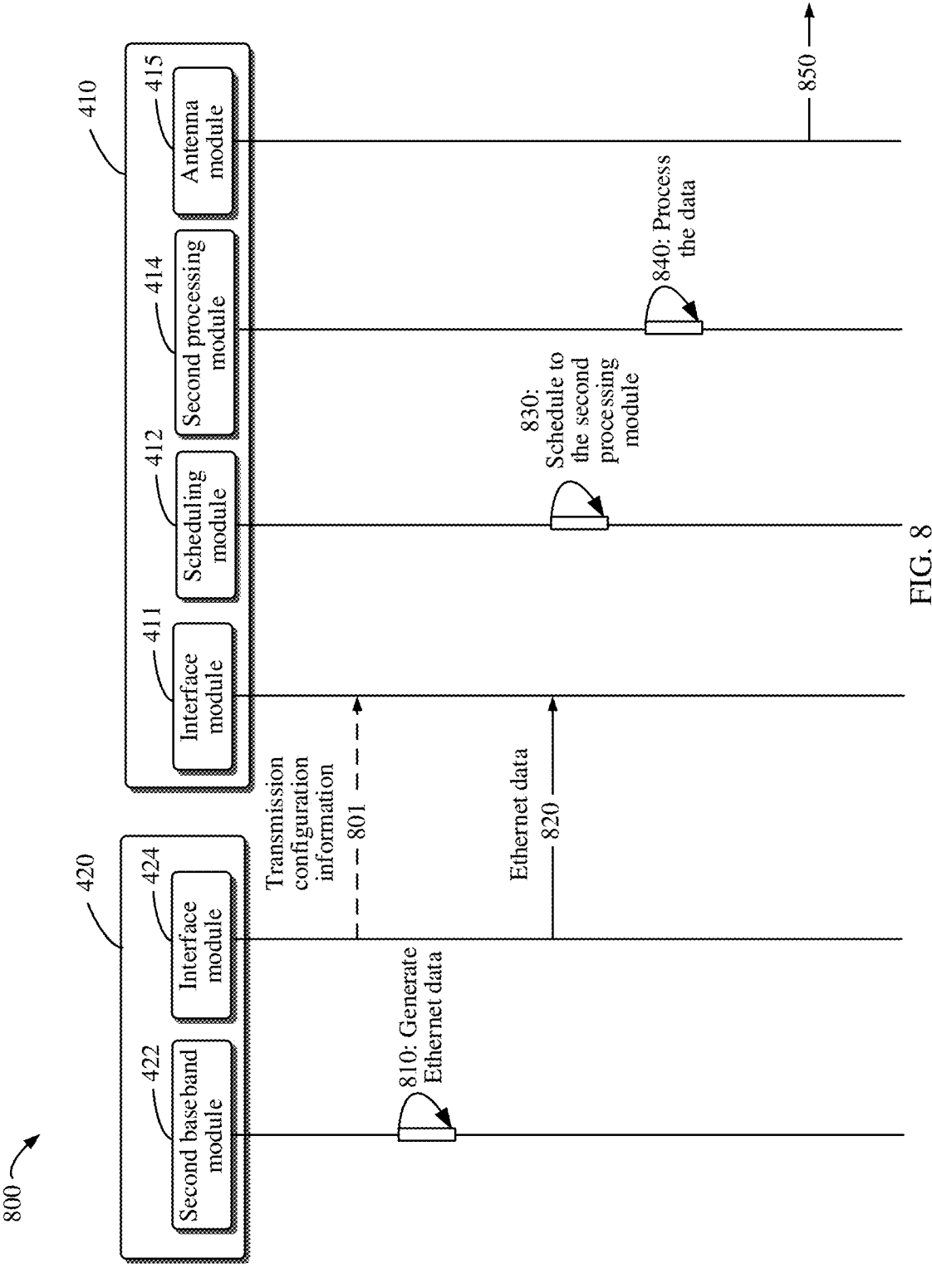
FIG. 8 is a signaling interaction diagram of a data transmission process according to some embodiments of this disclosure.

The following describes some embodiments of this disclosure in more detail with reference to signaling interaction diagrams shown in FIG. 6 to FIG. 8.

FIG. 6 is a signaling interaction diagram of a data transmission process 600 according to some embodiments of this disclosure. FIG. 6 relates to a first signal processing device 410 and a second signal processing device 420, and the process 600 is downlink transmission from the second signal processing device 420 to the first signal processing device 410.

A first baseband module 421 of the second signal processing device 420 generates 610 time domain data. Specifically, the first baseband module 421 may generate the time domain data by performing a series of operations such as encoding, rate matching, . . . , and CP addition.

The time domain data may also be referred to as in-phase/quadrature (I/Q) data, or may be referred to as baseband quadrature sampling data, or may be referred to as CPRI data or another name. This is not limited in this disclosure. Optionally, the time domain data generated by the first baseband module 421 may be digital baseband data obtained through in-phase or quadrature modulation on a user plane.

The time domain data generated by the first baseband module 421 may include multiple I/Q data streams corresponding to a first quantity of antenna channels. Optionally, the time domain data generated by the first baseband module 421 may be referred to as multichannel first I/Q data, and a quantity indicated by the term "multichannel" is equal to the first quantity, for example, any value of 1, 2, 4 or 8.

A basic unit of time domain data transmission is a base frame (base frame). For example, duration of one base frame is $1/3.84$ MHz=260.41667 nanoseconds (ns). One base frame may include 16 sampling points, where a $1^{st}$ sampling point is used for transmitting a control word, and a $2^{nd}$ sampling point to a $16^{th}$ sampling point are used for transmitting the I/Q data. For ease of description, remaining 15 sampling points other than the $1^{st}$ sampling point in the base frame may be referred to as a chip, in other words, one base frame includes a transmission control word of one sampling point and the chip of 15 sampling points.

It may be understood that, although in the foregoing examples, the chip includes the 15 sampling points, embodiments of this disclosure are not limited thereto. For example, a quantity of sampling points included in the chip may be equal to 8 or another value. In addition, the foregoing "sampling point" may also be referred to as a word, another name, or the like. This is not limited in this disclosure.

A bit width of a sampling point may represent how many bits are included in the sampling point. Therefore, it can be understood that the bit width may be used for determining a quantity of bits included in the chip. During specific implementation, baseband configuration information of the first baseband module 421 may include the bit width, in other words, the bit width may be pre-configured in the first baseband module 421. A specific value of the bit width is not limited in embodiments of this disclosure. For example, the bit width may be equal to 15 bits or another value.

A conversion module 423 of the second signal processing device 420 converts (620) the time domain data into Ethernet data.

Specifically, the conversion module 423 may perform packet assembly on multiple chips in the time domain data to obtain the corresponding Ethernet data.

In some embodiments, the conversion module 423 may sequentially concatenate the chips in the time domain data, and use concatenated data as a payload of the Ethernet data. FIG. 7 is a schematic diagram of a case 700 in which time domain data is converted into Ethernet data according to some embodiments of this disclosure.

As shown in FIG. 7, a basic unit of the time domain data 710 is a base frame 712, and the base frame 712 includes a control word 7121 and a chip 7122. As shown in FIG. 7, a basic unit of the time domain data 710 is a base frame 712, and the base frame 712 includes a control word 7121 and a chip 7122. The Ethernet data 720 may include a transport network layer header 721, a common header 722, a service header 723, and a payload 724, and optionally, may also include padding 725. For example, packet assembly may be performed on multiple chips 7122 and the multiple chips 7122 are used as the payload 724 of the Ethernet data 720.

In some embodiments of this disclosure, a quantity of the multiple chips included in a packet of the Ethernet data 720 may be determined based on the following factors: a first quantity, a quantity of sampling points included in the chip, a bit width of the sampling point, and a transmission bandwidth.

For example, it is assumed that the bandwidth is 20 MHz, a maximum transmission unit (MTU) of Ethernet data corresponding to the bandwidth is 1500 bytes, and a length of a packet header is 64 bytes. It is assumed that the first quantity is equal to 4, the quantity of sampling points included in the chip is equal to 8, and the bit width of the sampling point is equal to 15. In an example, it may be determined that the quantity of the multiple chips is obtained by rounding down $(1500-64)/(4\times8\times15\times2/8)$, that is, 11. In this way, the transmission bandwidth can be fully utilized, transmission efficiency of the Ethernet can be ensured, and a waste of resources can be avoided.

It may be understood that the foregoing manner of determining the quantity of the multiple chips is merely an example. In an actual scenario, the quantity of the multiple chips may be equal to another value, for example, may be equal to a value, for example, 10 or 9, smaller than the quantity determined in the foregoing manner. This is not limited in this disclosure.

An interface module 424 of a second signal processing device 420 transmits 630 the Ethernet data to a first signal processing device 410 through an optical fiber 430. Correspondingly, an interface module 411 of the first signal processing device 410 may receive the Ethernet data from the second signal processing device 420.

A scheduling module 412 of the first signal processing device 410 schedules 640 the Ethernet data to a first processing module 413 based on transmission configuration information.

In some embodiments of this disclosure, the transmission configuration information may be pre-sent by the second signal processing device 420 to the first signal processing device 410. Refer to FIG. 6. The interface module 424 of the second signal processing device 420 sends (601) the transmission configuration information to the first signal processing device 410. Correspondingly, the interface module 411 of the first signal processing device 410 may receive the transmission configuration information.

In some embodiments, the transmission configuration information may include indication information indicating whether processing is performed by the first processing module 413. For example, the indication information may be understood as a switch used by the first processing module 413 to process data, for example, may be 1 or 0. It may be understood that the indication information may alternatively be in another form. This is not limited in this disclosure. If the indication information indicates that the processing is performed by the first processing module 413, the scheduling module 412 of the first signal processing device 410 schedules, to the first processing module 413, the Ethernet data received from the interface module 411. If the indication information indicates that the processing is not performed by the first processing module 413, the scheduling module 412 of the first signal processing device 410 schedules, to the second processing module 414, the Ethernet data received from the interface module 411.

In some embodiments, the transmission configuration information may include first indication information and second indication information. The first indication information indicates a correspondence between a first frequency band range and the first processing module 413, and the second indication information indicates a correspondence between a second frequency band range and the second processing module 414. For example, a specific field of the Ethernet data received from the interface module 411 may carry frequency information. If the frequency information is in the first frequency band range, the scheduling module 412 of the first signal processing device 410 schedules, to the first processing module 413, the Ethernet data received from the interface module 411. If the frequency information is in the second frequency band range, the scheduling module 412 of the first signal processing device 410 schedules, to the second processing module 414, the Ethernet data received from the interface module 411.

It should be noted that the transmission configuration information in embodiments of this disclosure may alternatively include another indication form, so that the scheduling module 412 may determine, based on the transmission configuration information, to schedule the Ethernet data from the interface module 411 to the first processing module 413 or the second processing module 414. In the process 600 in FIG. 6, it is assumed that the scheduling module 412 schedules the Ethernet data to the first processing module 413.

The first processing module 413 processes the Ethernet data from the scheduling module 412 according to a first splitting mode. The first splitting mode may be a time domain splitting mode. Optionally, the first splitting mode maybe a splitting mode that supports the CPRI protocol. With reference to FIG. 3, the first splitting mode maybe option 8 shown in FIG. 3. For example, the first processing module 413 performs RF processing on the Ethernet data, but does not perform processing at a physical layer.

Refer to FIG. 6. A conversion submodule 530 converts 650 the Ethernet data into the time domain data. Specifically, the conversion submodule 530 may convert the Ethernet data into a first quantity of multichannel first time domain data.

In some embodiments of this disclosure, the first quantity may be pre-configured by the second signal processing device 420 to the first signal processing device 410. In some embodiments, for example, the transmission configuration information in 601 may include the first quantity. In some other embodiments, the first quantity may be independent of the transmission configuration information, for example, the second signal processing device 420 informs the first signal processing device 410 of the first quantity based on another piece of separate signaling.

The conversion submodule 530 may determine the corresponding first quantity of multichannel first time domain data based on splitting of a payload of the Ethernet data. An Ethernet payload may be an eCPRI payload. The conversion submodule 530 may split the payload based on a size of a chip, and add a control word to the chip, to obtain a base frame, so that the multichannel first time domain data is obtained.

A beamforming submodule 540 converts the first quantity of multichannel first time domain data into a second quantity of multichannel second time domain data, where the second quantity is greater than the first quantity.

Specifically, the beamforming submodule 540 may determine the second quantity of multichannel second time domain data based on the first quantity of multichannel first time domain data and multiple first antenna weight parameters.

In some embodiments of this disclosure, the second quantity and/or the multiple first antenna weight parameters may be pre-configured by the second signal processing device 420 to the first signal processing device 410. In some embodiments, for example, the transmission configuration information in 601 may include the second quantity and/or the multiple first antenna weight parameters. In some other embodiments, the second quantity and/or the multiple first antenna weight parameters may be independent of the transmission configuration information, for example, the second signal processing device 420 informs the first signal processing device 410 of the second quantity and/or the multiple first antenna weight parameters based on another piece of separate signaling. For example, the second quantity may correspond to a quantity of antenna channels of an antenna module 415. For example, the second quantity may be equal to or less than a total quantity of channels of the antenna module 415.

For ease of description, the first quantity may be represented as N1, the second quantity may be represented as N2, and N1<N2. In some embodiments, at least a part of N1-channel first time domain data may be duplicated to obtain N2-channel time domain data; and then each piece of the N2-channel time domain data is multiplied by a weight parameter of a corresponding first antenna, to obtain N2-channel second time domain data.

For example, it is assumed that N1=4, and N2=32. Each of the N1-channel first time domain data maybe duplicated to obtain eight copies, to obtain 32-channel time domain data. For example, $1^{st}$-channel time domain data in the 32-channel time domain data to $8^{th}$-channel time domain data in the 32-channel time domain data is $1^{st}$-channel first time domain data in the N1-channel first time domain data, $9^{th}$-channel time domain data in the 32-channel time domain data to $16^{th}$-channel time domain data in the 32-channel time domain data is $2^{nd}$-channel first time domain data in the N1-channel first time domain data, $17^{th}$-channel time domain data in the 32-channel time domain data to $24^{th}$-channel time domain data in the 32-channel time domain data is $3^{rd}$-channel first time domain data in the N1-channel first time domain data, and $25^{th}$-channel time domain data in the 32-channel time domain data to $32^{nd}$-channel time domain data in the 32-channel time domain data is $4^{th}$-channel first time domain data in the N1-channel first time domain data. Optionally, the multiple first antenna weight parameters are a second quantity of multiple first antenna weight parameters, and the multiple first antenna weight parameters may be successively represented as wt1, wt2, . . . , and wtN2. In this way, $i^{th}$-channel time domain data in the 32-channel time domain data maybe multiplied by wti (where i=1, 2, . . . , N2), to obtain $i^{th}$-channel second time domain data in the N2-channel second time domain data.

It should be noted that the embodiment in which the beamforming submodule 540 obtains the second quantity of multichannel second time domain data based on the first quantity of multichannel first time domain data is merely an example, and this disclosure is not limited thereto. For example, the beamforming submodule 540 may duplicate a $j^{th}$-channel (where j=1, 2, . . . , N1) first time domain data in the N1-channel first time domain data to obtain N2 copies, and multiply each of the N2 copies by a weight parameter of a corresponding first antenna wti (where i=1, 2, . . . , N2) that is obtained.

It should be noted that the data processing process performed by the first processing module 413 described in embodiments of this disclosure is merely an example. In an actual scenario, other processing, such as power amplification and filtering, may be further included.

The antenna module 415 of the first signal processing device 410 transmits 670 the multichannel second time domain data. Specifically, the antenna module 415 may send the N2-channel second time domain data to a terminal device through N2 antenna channels of the antenna module 415.

In this way, the conversion module 423 of the second signal processing device 420 in embodiments of this disclosure may convert the time domain data into the Ethernet data, so that the Ethernet data can be transmitted to the first signal processing device 410 through an eCPRI optical fiber. In this way, more cells can be supported, and air interface performance is improved. In addition, the first processing module 413 of the first signal processing device 410 can process the Ethernet data from the second signal processing device 420 according to the first splitting mode, to support the first frequency band range.

FIG. 8 is a signaling interaction diagram of a data transmission process 800 according to some embodiments of this disclosure. FIG. 8 relates to a first signal processing device 410 and a second signal processing device 420, and the process 800 is downlink transmission from the second signal processing device 420 to the first signal processing device 410.

A second baseband module 422 of the second signal processing device 420 generates 810 Ethernet data.

An interface module 424 of the second signal processing device 420 transmits 820 the Ethernet data to the first signal processing device 410 through an optical fiber 430. Correspondingly, an interface module 411 of the first signal processing device 410 may receive the Ethernet data from the second signal processing device 420.

A scheduling module 412 of the first signal processing device 410 schedules 830 the Ethernet data to a second processing module 414 based on transmission configuration information.

In some embodiments of this disclosure, the transmission configuration information may be pre-sent by the second signal processing device 420 to the first signal processing device 410. Refer to FIG. 8. The interface module 424 of the second signal processing device 420 sends (801) the transmission configuration information to the first signal processing device 410. Correspondingly, the interface module 411 of the first signal processing device 410 may receive the transmission configuration information. For the transmission configuration information, refer to embodiments described with reference to 601 in FIG. 6. For brevity, details are not described herein.

The second processing module 414 processes (840) the Ethernet data from the scheduling module 412 according to a second splitting mode. The second splitting mode may be a splitting mode inside a physical layer. Optionally, the second splitting mode maybe a splitting mode that supports the eCPRI protocol. With reference to FIG. 3, the second splitting mode may be option 7-1, option 7-2, or option 7-3 shown in FIG. 3. For example, the second processing module 414 performs low-physical-layer processing and RF processing on the Ethernet data, but does not perform high-physical-layer processing. For example, the second splitting mode is option 7-1. Processing performed by the second processing module 414 may include operations such as iFFT and CP addition.

It should be noted that the data processing process performed by the second processing module 414 described in embodiments of this disclosure is merely an example. In an actual scenario, the processing process may include, for example, frequency domain beamforming, power amplification, and filtering. In some examples, for a specific operation performed by the second processing module 414, refer to operations performed by an AAU in conventional technologies.

An antenna module 415 of the first signal processing device 410 transmits 850 downlink data.

In this way, the second baseband module 422 of the second signal processing device 420 in embodiments of this disclosure can generate the Ethernet data, so that the Ethernet data can be transmitted to the first signal processing device 410 through an eCPRI optical fiber. In addition, the second processing module 414 of the first signal processing device 410 can process the Ethernet data from the second signal processing device 420 according to the second splitting mode, to support a second frequency band range.

Figure 9:
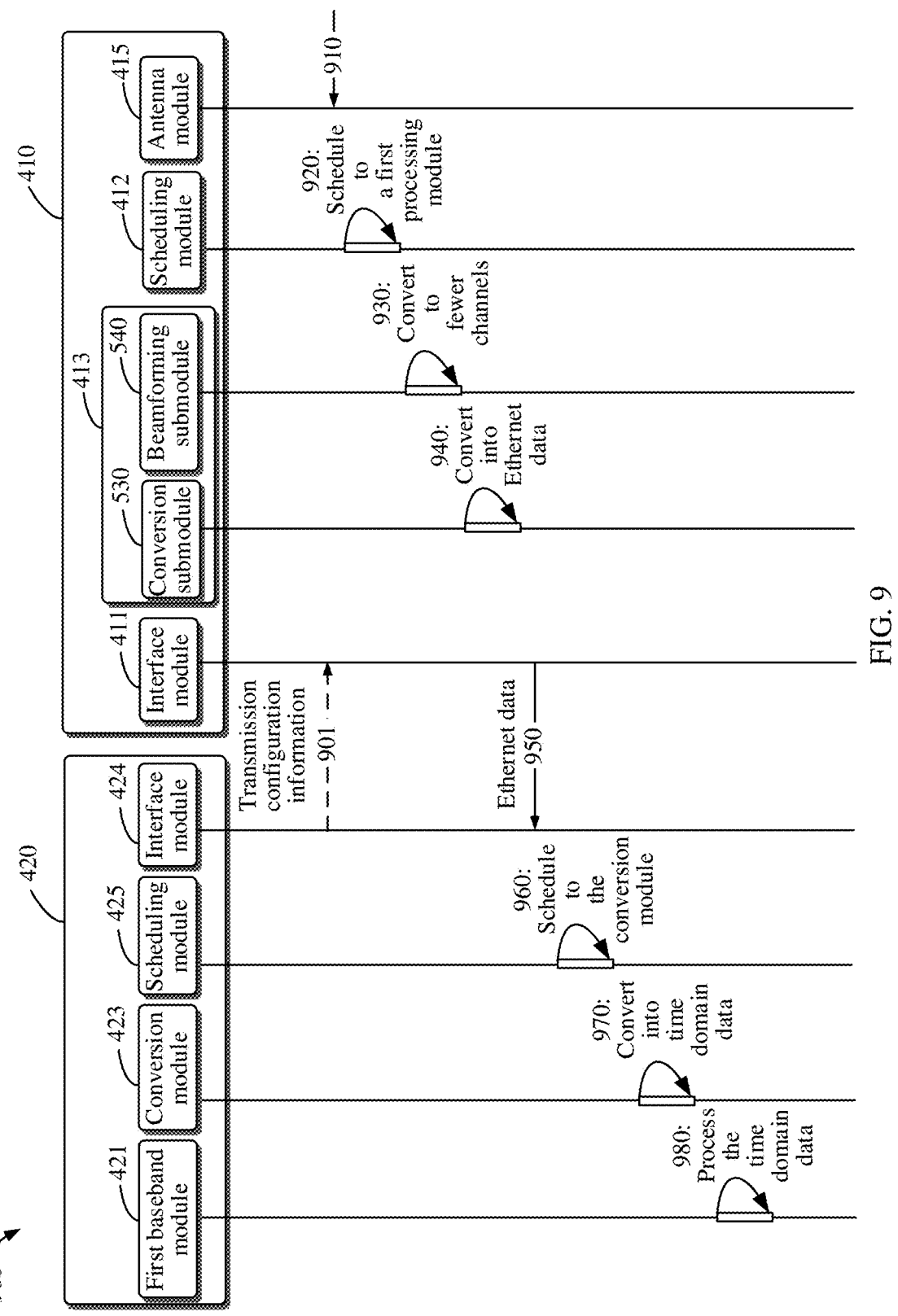
FIG. 9 is a signaling interaction diagram of a data transmission process according to some embodiments of this disclosure.

FIG. 9 is a signaling interaction diagram of a data transmission process 900 according to some embodiments of this disclosure. FIG. 9 relates to a first signal processing device 410 and a second signal processing device 420, and the process 900 is uplink transmission from the first signal processing device 410 to the second signal processing device 420.

An antenna module 415 of the first signal processing device 410 receives 910 uplink data. For example, the uplink data may come from a terminal device. Optionally, a second quantity of antenna channels of the antenna module 415 may receive multichannel data, which is referred to as, for example, a second quantity of multichannel second time domain data.

A scheduling module 412 of the first signal processing device 410 schedules 920 the uplink data to a first processing module 413 based on transmission configuration information.

In some embodiments of this disclosure, the transmission configuration information may be pre-sent by the second signal processing device 420 to the first signal processing device 410. Refer to FIG. 9. An interface module 424 of the second signal processing device 420 sends (901) the transmission configuration information to the first signal processing device 410. Correspondingly, an interface module 411 of the first signal processing device 410 may receive the transmission configuration information.

In some embodiments, the transmission configuration information may include indication information indicating whether processing is performed by the first processing module 413. For example, the indication information may be understood as a switch used by the first processing module 413 to process data, for example, may be 1 or 0. It may be understood that the indication information may alternatively be in another form. This is not limited in this disclosure. If the indication information indicates that the processing is performed by the first processing module 413, the scheduling module 412 of the first signal processing device 410 schedules, to the first processing module 413, the uplink data received from the antenna module 415. If the indication information indicates that the processing is not performed by the first processing module 413, the scheduling module 412 of the first signal processing device 410 schedules, to the second processing module 414, the uplink data received from the antenna module 415.

In some embodiments, the transmission configuration information may include first indication information and second indication information. The first indication information indicates a correspondence between a first frequency band range and the first processing module 413, and the second indication information indicates a correspondence between a second frequency band range and the second processing module 414. For example, a specific field of the uplink data received by the antenna module 415 may carry frequency information. If the frequency information is in the first frequency band range, the scheduling module 412 of the first signal processing device 410 schedules, to the first processing module 413, the uplink data received from the antenna module 415. If the frequency information is in the second frequency band range, the scheduling module 412 of the first signal processing device 410 schedules, to the second processing module 414, the uplink data received from the antenna module 415.

It should be noted that the transmission configuration information in embodiments of this disclosure may alternatively include another indication form, so that the scheduling module 412 may determine, based on the transmission configuration information, to schedule, to the first processing module 413 or the second processing module 414, the uplink data received from the antenna module 415. In the process 900 in FIG. 9, it is assumed that the scheduling module 412 schedules the uplink data to the first processing module 413.

The first processing module 413 processes the uplink data from the scheduling module 412 according to a first splitting mode. The first splitting mode may be a time domain splitting mode. Optionally, the first splitting mode maybe a splitting mode that supports the CPRI protocol. With reference to FIG. 3, the first splitting mode maybe option 8 shown in FIG. 3. For example, the first processing module 413 performs RF processing on the uplink data, but does not perform processing at a physical layer.

Refer to FIG. 9. A beamforming submodule 540 converts (930) the uplink data into a first quantity of multichannel first time domain data, where the first quantity is less than the second quantity.

In some embodiments of this disclosure, the first quantity may be pre-configured by the second signal processing device 420 to the first signal processing device 410. In some embodiments, for example, the transmission configuration information in 901 may include the first quantity. In some other embodiments, the first quantity may be independent of the transmission configuration information, for example, the second signal processing device 420 informs the first signal processing device 410 of the first quantity based on another piece of separate signaling.

The beamforming submodule 540 may convert the second quantity of multichannel second time domain data into the first quantity of multichannel first time domain data. Specifically, the beamforming submodule 540 may determine the first quantity of multichannel first time domain data based on the second quantity of multichannel second time domain data and multiple second antenna weight parameters.

In some embodiments of this disclosure, the multiple second antenna weight parameters may be pre-configured by the second signal processing device 420 to the first signal processing device 410. In some embodiments, for example, the transmission configuration information in 901 may include the multiple second antenna weight parameters. In some other embodiments, the multiple second antenna weight parameters may be independent of the transmission configuration information, for example, the second signal processing device 420 informs the first signal processing device 410 of the multiple second antenna weight parameters based on another piece of separate signaling.

For ease of description, the first quantity may be represented as N1, the second quantity may be represented as N2, and N1<N2. In some embodiments, each piece of N2-channel second time domain data may be multiplied by a weight parameter of a corresponding second antenna, to obtain N2-channel time domain data; and then at least a part of the N2-channel time domain data is combined, to obtain N1-channel first time domain data.

For example, it is assumed that N1=4, and N2=32. Optionally, the multiple second antenna weight parameters are a second quantity of multiple second antenna weight parameters, and the multiple second antenna weight parameters may be successively represented as wr1, wr2, . . . , and wrN2. $i^{th}$-channel second time domain data in the N2-channel second time domain data may be multiplied by wr1 (where i=1, 2, . . . , N2), to obtain $i^{th}$-channel time domain data in the N2-channel time domain data. Then, $1^{st}$-channel time domain data in the N2-channel time domain data to 8th-channel time domain data in the N2-channel time domain data maybe combined (for example, summed) to obtain $1^{st}$-channel first time domain data in the N1-channel first time domain data, $9^{th}$-channel time domain data in the N2-channel time domain data to $16^{th}$-channel time domain data in the N2-channel time domain data maybe combined (for example, summed) to obtain 2nd-channel first time domain data in the N1-channel first time domain data, $17^{th}$-channel time domain data in the N2-channel time domain data to $24^{th}$-channel in the N2-channel time domain data may be combined (for example, summed) to obtain $3^{rd}$-channel first time domain data in the N1-channel first time domain data, and $25^{th}$-channel in the N2-channel time domain data to $32^{nd}$-channel time domain data in the N2-channel time domain data may be combined (for example, summed) to obtain $4^{th}$-channel first time domain data in the N1-channel first time domain data.

It should be noted that the data processing process performed by the first processing module 413 described in embodiments of this disclosure is merely an example. In an actual scenario, other processing, such as power amplification and filtering, may be further included.

A conversion submodule 530 converts (940) the first quantity of multichannel first time domain data into Ethernet data. Specifically, a conversion operation performed by the conversion submodule 530 is similar to the conversion operation 620 performed by the conversion module 423 of the second signal processing device 420 described with reference to FIG. 6. For brevity, details are not described herein.

The interface module 411 of the first signal processing device 410 transmits 950 the Ethernet data to the second signal processing device 420. Correspondingly, the interface module 424 of the second signal processing device 420 may receive the Ethernet data from the first signal processing device 410.

A scheduling module 425 of the second signal processing device 420 schedules 960 the Ethernet data to a conversion module 423. Specifically, the scheduling module 425 may perform scheduling based on frequency information of the Ethernet data. If the frequency information is in the first frequency band range, the scheduling module 425 of the second signal processing device 420 schedules, to the conversion module 423, the Ethernet data received from the interface module 424. If the frequency information is in the second frequency band range, the scheduling module 425 of the second signal processing device 420 schedules, to a second baseband module 422, the Ethernet data received from the interface module 424. In the process 900 in FIG. 9, it is assumed that the scheduling module 425 schedules the Ethernet data to the conversion module 423.

The conversion module 423 of the second signal processing device 420 converts 970 the Ethernet data into time domain data. Specifically, the conversion module 423 may convert the Ethernet data into the first quantity of multichannel first time domain data.

The conversion module 423 may determine the corresponding first quantity of multichannel first time domain data based on splitting of a payload of the Ethernet data. An Ethernet payload may be an eCPRI payload. The conversion module 423 may split the payload based on a size of a chip, and add a control word to the chip, to obtain a base frame, so that the multichannel first time domain data is obtained.

A first baseband module 421 of the second signal processing device 420 processes 980 the time domain data. Specifically, the first baseband module 421 may process the time domain data by performing a series of operations such as CP removal, FFT, . . . , and decoding.

Figure 10:
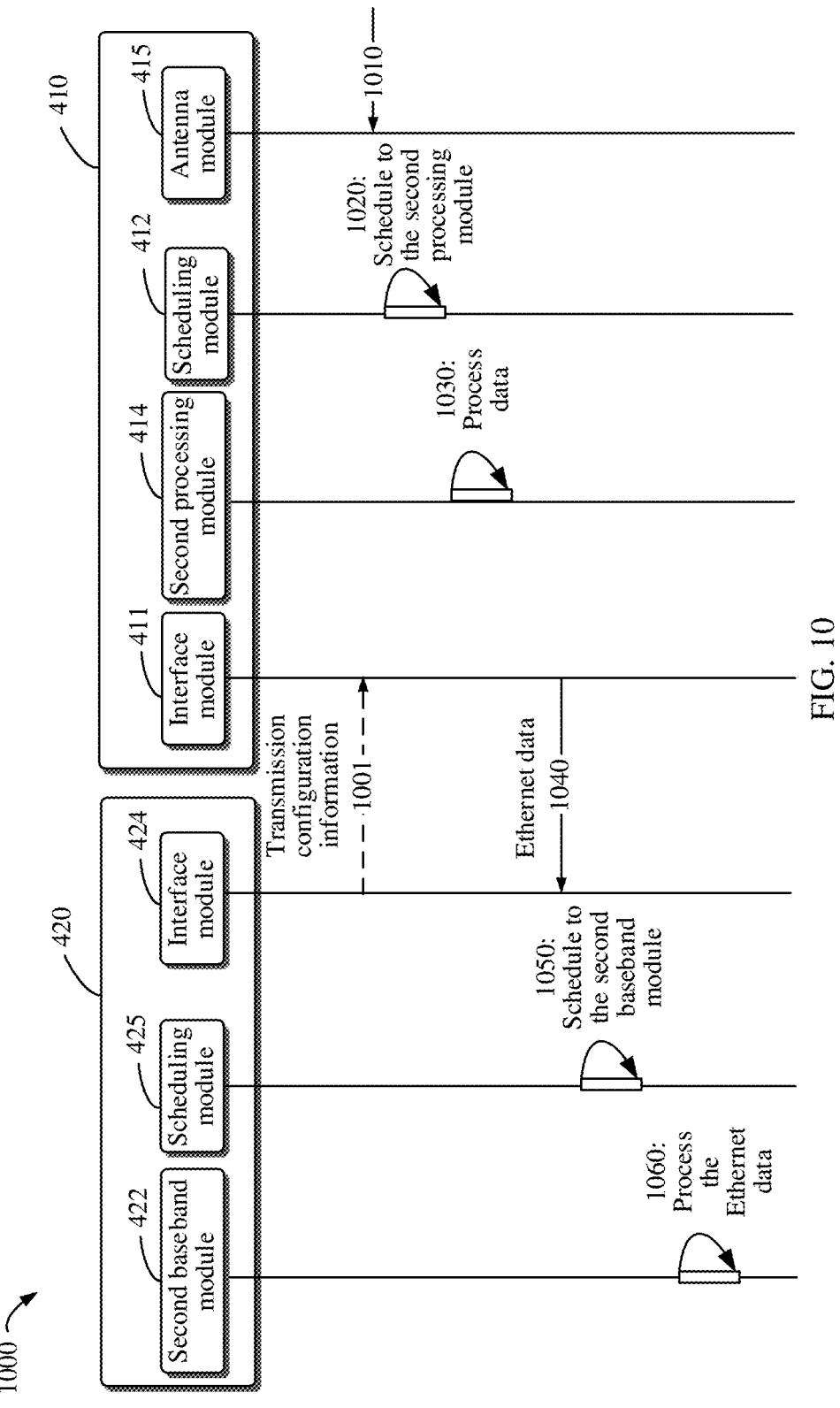
FIG. 10 is a signaling interaction diagram of a data transmission process according to some embodiments of this disclosure.

FIG. 10 is a signaling interaction diagram of a data transmission process 1000 according to some embodiments of this disclosure. FIG. 10 relates to a first signal processing device 410 and a second signal processing device 420, and the process 1000 is uplink transmission from the first signal processing device 410 to the second signal processing device 420.

An antenna module 415 of the first signal processing device 410 receives 1010 uplink data.

A scheduling module 412 of the first signal processing device 410 schedules 1020 the uplink data to a second processing module 414 based on transmission configuration information.

In some embodiments of this disclosure, the transmission configuration information may be pre-sent by the second signal processing device 420 to the first signal processing device 410. Refer to FIG. 10. An interface module 424 of the second signal processing device 420 sends (1001) the transmission configuration information to the first signal processing device 410. Correspondingly, an interface module 411 of the first signal processing device 410 may receive the transmission configuration information.

In some embodiments, the transmission configuration information may include indication information indicating whether processing is performed by a first processing module 413. For example, the indication information may be understood as a switch used by the first processing module 413 to process data, for example, may be 1 or 0. It may be understood that the indication information may alternatively be in another form. This is not limited in this disclosure. If the indication information indicates that the processing is performed by the first processing module 413, the scheduling module 412 of the first signal processing device 410 schedules, to the first processing module 413, the uplink data received from the antenna module 415. If the indication information indicates that the processing is not performed by the first processing module 413, the scheduling module 412 of the first signal processing device 410 schedules, to the second processing module 414, the uplink data received from the antenna module 415.

In some embodiments, the transmission configuration information may include first indication information and second indication information. The first indication information indicates a correspondence between a first frequency band range and the first processing module 413, and the second indication information indicates a correspondence between a second frequency band range and the second processing module 414. For example, a specific field of the uplink data received from the antenna module 415 may carry frequency information. If the frequency information is in the first frequency band range, the scheduling module 412 of the first signal processing device 410 schedules, to the first processing module 413, the uplink data received from the antenna module 415. If the frequency information is in the second frequency band range, the scheduling module 412 of the first signal processing device 410 schedules, to the second processing module 414, the uplink data received from the antenna module 415.

It should be noted that the transmission configuration information in embodiments of this disclosure may alternatively include another indication form, so that the scheduling module 412 may determine, based on the transmission configuration information, to schedule, to the first processing module 413 or the second processing module 414, the uplink data received from the antenna module 415. In the process 1000 in FIG. 10, it is assumed that the scheduling module 412 schedules the uplink data to the second processing module 414.

The second processing module 414 processes (1030) the uplink data from the scheduling module 412 according to a second splitting mode. The second splitting mode may be a splitting mode inside a physical layer. Optionally, the second splitting mode maybe a splitting mode that supports the eCPRI protocol. With reference to FIG. 3, the second splitting mode may be option 7-1, option 7-2, or option 7-3 shown in FIG. 3. For example, the second processing module 414 performs low-physical-layer processing and RF processing on Ethernet data, but does not perform high-physical-layer processing. For example, the second splitting mode is option 7-1. Processing performed by the second processing module 414 may include operations such as CP removal and FFT.

It should be noted that the data processing process performed by the second processing module 414 described in embodiments of this disclosure is merely an example. In an actual scenario, the processing process may include, for example, frequency domain beamforming, power amplification, and filtering. In some examples, for a specific operation performed by the second processing module 414, refer to operations performed by an AAU in conventional technologies. It may be understood that processed data of the second processing module 414 is the Ethernet data.

The interface module 411 of the first signal processing device 410 transmits 1040 the Ethernet data to the second signal processing device 420. Correspondingly, the interface module 424 of the second signal processing device 420 may receive the Ethernet data from the first signal processing device 410.

A scheduling module 425 of the second signal processing device 420 schedules 1050 the Ethernet data to a second baseband module 422. Specifically, the scheduling module 425 may perform scheduling based on frequency information of the Ethernet data. If the frequency information is in the first frequency band range, the scheduling module 425 of the second signal processing device 420 schedules, to a conversion module 423, the Ethernet data received from the interface module 424. If the frequency information is in the second frequency band range, the scheduling module 425 of the second signal processing device 420 schedules, to the second baseband module 422, the Ethernet data received from the interface module 424. In the process 1000 in FIG. 10, it is assumed that the scheduling module 425 schedules the Ethernet data to the second baseband module 422.

The second baseband module 422 of the second signal processing device 420 processes 1060 the Ethernet data. Specifically, for example, the second splitting mode is option 7-1, the second baseband module 422 may perform a series of operations such as port reduction, RE demapping, . . . , and decoding on the data.

In this way, in embodiments of this disclosure, the uplink data from the antenna module 415 can be scheduled by the scheduling module 412 to the first processing module 413 or the second processing module 414 based on the transmission configuration information. In this way, the first processing module 413 can process the uplink data according to the first splitting mode, and the second processing module 414 can process the uplink data according to the second splitting mode, so that the first frequency band range and the second frequency band range can be simultaneously supported.

It should be understood that in embodiments of this disclosure, "first", "second", "third", and the like are merely intended to indicate that multiple objects may be different, but two objects maybe the same. "First", "second", "third", and the like should not be construed as any limitation on embodiments of this disclosure.

It should be further understood that division into the manners, cases, categories, and embodiments in embodiments of this disclosure is merely intended for ease of description, and should not constitute a particular limitation. The features in the manners, categories, cases, and embodiments may be combined with each other if logical.

It should be further understood that the foregoing content is merely intended to help a person skilled in the art better understand embodiments of this disclosure, but is not intended to limit the scope of embodiments of this disclosure. A person skilled in the art may make various modifications, variations, combinations, or the like based on the foregoing content. A modified, changed, or combined solution also falls within the scope of embodiments of this disclosure.

It should be further understood that the descriptions of the foregoing content focus on emphasizing a difference between the embodiments, and for the same or similar content of the embodiments, reference may be made to each other. For brevity, details are not described herein.

Figure 11:
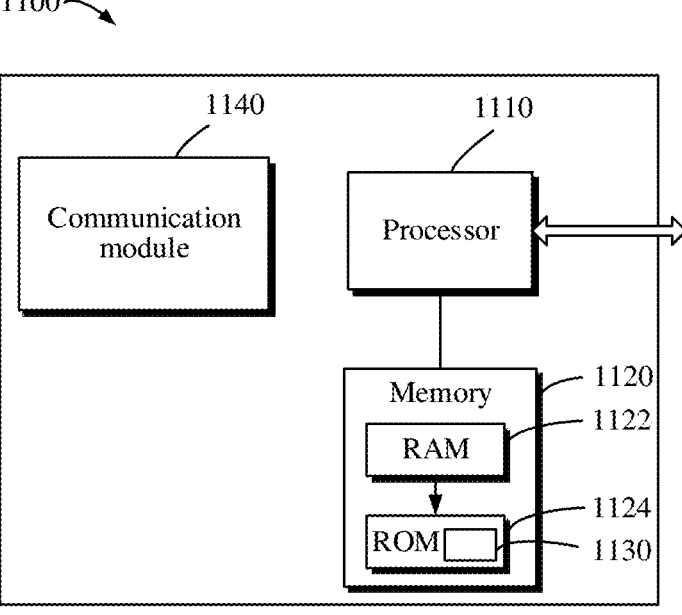
FIG. 11 is a schematic block diagram of an example device that may be used for implementing embodiments of this disclosure.

FIG. 11 is a schematic block diagram of an example device 1100 that may be used for implementing embodiments of this disclosure. The device 1100 maybe implemented as or included in a first signal processing device 410 in FIG. 4, or the device 1100 may be implemented as or included in a second signal processing device 420 in FIG. 4. As shown in the figure, the device 1100 includes one or more processors 1110, one or more memories 1120 coupled to the processor 1110, and a communication module 1140 coupled to the processor 1110.

The communication module 1140 may be configured for bidirectional communication. The communication module 1140 may have at least one communication interface for communication. The communication interface may include any interface necessary for communicating with another device.

The processor 1110 may be any type suitable for a local technology network, and may include but is not limited to at least one of the following: one or more of a general-purpose computer, a dedicated computer, a microcontroller, a digital signal processor (DSP), or a controller-based multi-core controller architecture. The device 1100 may have multiple processors, such as application-specific integrated circuit chips, which are, in terms of time, subject to a clock synchronized with a main processor.

The memory 1120 may include one or more non-volatile memories and one or more volatile memories. An example of the non-volatile memory includes, but is not limited to at least one of the following: a read-only memory (ROM) 1124, an erasable programmable read-only memory (EPROM), a flash memory, a hard disk, a compact disc (CD), a digital video disc (DVD) or another magnetic storage and/or optical storage. An example of the volatile memory includes, but is not limited to at least one of the following: a random access memory (RAM) 1122, or another volatile memory that does not last for power-off duration.

A computer program 1130 includes computer-executable instructions executed by an associated processor 1110. The program 1130 may be stored in the ROM 1124. The processor 1110 may perform any suitable action and processing by loading the program 1130 into the RAM 1122.

Embodiments of this disclosure may be implemented by the program 1130, so that the device 1100 may perform any process discussed with reference to FIG. 6 to FIG. 10. Embodiments of this disclosure may also be implemented using hardware or a combination of software and hardware.

The program 1130 may be tangibly included in a computer-readable medium, and the computer-readable medium may be included in the device 1100 (for example, in the memory 1120) or another storage device that maybe accessed by the device 1100. The program 1130 may be loaded from the computer-readable medium to the RAM 1122 for execution. The computer-readable medium may include any type of tangible non-volatile memory, such as a ROM, an EPROM, a flash memory, a hard disk, a CD, or a DVD.

In some embodiments, the communication module 1140 in the device 1100 maybe implemented as a transmitter and a receiver (or a transceiver). The communication module 1140 may be configured to send/receive first scheduling indication information, second scheduling indication information, transmission data, and the like. In addition, the device 1100 may further include one or more of a scheduler, a controller, and a radio frequency/antenna. Details are not described in this disclosure.

For example, the device 1100 in FIG. 11 may be implemented as an electronic device, or may be implemented as a chip or a chip system in the electronic device. This is not limited in embodiments of this disclosure.

An embodiment of this disclosure further provides a communication system. The communication system may include the foregoing first signal processing device and the foregoing second signal processing device.

An embodiment of this disclosure further provides a chip. The chip may include an input interface, an output interface, and a processing circuit. In embodiments of this disclosure, the input interface and the output interface may complete signaling or data interaction, and the processing circuit may complete generation and processing of signaling or data information.

An embodiment of this disclosure further provides a chip system, including a processor, configured to support a computing device to implement a function in any one of the foregoing embodiments. In a possible design, the chip system may further include a memory, configured to store necessary program instructions and data. When the processor runs the program instructions, a device on which the chip system is installed is enabled to implement the method in any one of the foregoing embodiments. For example, the chip system may include one or more chips, or may include a chip and another discrete component.

Embodiments of this disclosure further provide a processor, configured to be coupled to a memory, where the memory stores instructions, and when the processor runs the instructions, the processor is enabled to perform the method and the function in any one of the foregoing embodiments.

An embodiment of this disclosure further provides a computer program product including instructions. When the computer program product runs on a computer, the computer is enabled to perform the method and the function in any one of the foregoing embodiments.

An embodiment of this disclosure further provides a computer-readable storage medium. The computer-readable storage medium stores computer instructions. When a processor runs the instructions, the processor is enabled to perform the method and the function in any one of the foregoing embodiments.

Usually, various embodiments of this disclosure may be implemented by hardware or a dedicated circuit, software, logic, or any combination thereof. Some aspects may be implemented by the hardware, and other aspects may be implemented by firmware or software, and may be performed by a controller, a microprocessor, or another computing device. Although aspects of embodiments of this disclosure are shown and described as block diagrams, flowcharts, or some other figures, it should be understood that the blocks, apparatuses, systems, technologies, or methods described in this specification may be implemented as, for example, non-limiting examples, hardware, software, firmware, dedicated circuits or logic, general-purpose hardware or controllers or other computing devices, or a combination thereof.

This disclosure further provides at least one computer program product tangibly stored on a non-transitory computer-readable storage medium. The computer program product includes computer-executable instructions, such as instructions included in a program module, which are executed in a device on a real or virtual processor of a target, to perform the processes/methods described above with reference to the accompanying drawings. Usually, a program module includes a routine, a program, a library, an object, a class, a component, a data structure, or the like that performs a particular task or implements a particular abstract data type. In various embodiments, functions of the program module maybe combined or a function of the program module maybe as needed. Machine-executable instructions for the program module may be executed locally or within a distributed device. In the distributed device, the program module may be located in local and remote storage media.

Computer program code for implementing the method disclosed in this disclosure may be written in one or more programming languages. The computer program code may be provided for a processor of a general-purpose computer, a dedicated computer, or another programmable data processing apparatus, so that when the program code is executed by the computer or the another programmable data processing apparatus, a function/operation specified in the flowchart and/or the block diagram is implemented. The program code may be completely executed on a computer, partially executed on a computer, independently performed as a software package, partially executed on a computer and partially executed on a remote computer, or completely executed on a remote computer or a server.

In context of this disclosure, the computer program code or related data may be borne in any appropriate carrier, so that the device, the apparatus, or the processor can perform various processing and operations described above. An example of the carrier includes a signal, a computer-readable medium, and the like. An example of the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. A more detailed example of the computer-readable storage medium includes an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

Further, although operations of the methods disclosed in this disclosure are described in a particular order in the accompanying drawings, this does not require or imply that these operations need to be performed in the particular order or that all of the operations shown need to be performed to achieve a desired result. Instead, execution orders of the steps described in the flowchart may change. Additionally or alternatively, some steps may be omitted, multiple steps are combined into one step for execution, and/or one step is decomposed into multiple steps for execution. It should also be noted that features and functions of two or more apparatuses according to this disclosure may be specified in one apparatus. On the contrary, features and functions of one apparatus described above may be further divided into multiple apparatuses for materialization.

Implementations of this disclosure have been described above, and the foregoing descriptions are examples, not exhaustive, and are not limited to the implementations disclosed. Many modifications and changes are clear to a person of ordinary skill in the art without departing from the scope of the described implementations. Selection of terms used in this specification is intended to well explain implementation principles, actual application, or improvements to technologies in the market, or to enable another person of ordinary skill in the art to understand the implementations disclosed in this specification.

What is claimed is:

1. A first signal processing device, comprising:
an interface, configured to perform Ethernet data transmission with a second signal processing device through an optical fiber;
a scheduling circuit, configured to schedule to-be-processed data to a first processing circuit or a second processing circuit based on transmission configuration information from the second signal processing device, wherein the to-be-processed data comprises Ethernet data from the second signal processing device or uplink data from an antenna;

the first processing circuit, configured to process the to-be-processed data from the scheduling circuit according to a first splitting mode;
the second processing circuit, configured to process the to-be-processed data from the scheduling circuit according to a second splitting mode; and
the antenna, configured to send processed data of the first processing circuit or the second processing circuit, or to receive the uplink data.

2. The first signal processing device according to claim 1, wherein the first processing circuit comprises:
a conversion subcircuit, configured to implement conversion between the Ethernet data and time domain data; and
a beamforming subcircuit, configured to implement conversion between a first quantity of multichannel first time domain data and a second quantity of multichannel second time domain data, wherein the second quantity corresponds to a quantity of antenna channels of the antenna, and the first quantity is less than the second quantity.

3. The first signal processing device according to claim 2, wherein the to-be-processed data comprises the Ethernet data from the second signal processing device, and a quantity of antenna channels corresponding to the Ethernet data is the first quantity;
wherein the conversion subcircuit is configured to determine the multichannel first time domain data based on the Ethernet data; and
wherein the beamforming subcircuit is configured to determine the multichannel second time domain data based on the multichannel first time domain data and a second quantity of multiple first antenna weight parameters.

4. The first signal processing device according to claim 3, wherein the conversion subcircuit is configured to determine the multichannel first time domain data based on splitting of a payload of the Ethernet data.

5. The first signal processing device according to claim 2, wherein the to-be-processed data comprises the uplink data from the antenna, and the uplink data comprises the second quantity of multichannel second time domain data;
wherein the beamforming subcircuit is configured to determine the multichannel first time domain data based on the multichannel second time domain data and a second quantity of multiple second antenna weight parameters; and
wherein the conversion subcircuit is configured to determine the Ethernet data based on the multichannel first time domain data.

6. The first signal processing device according to claim 5, wherein the conversion subcircuit is configured to:
perform packet assembly on data of multiple chips in the multichannel first time domain data, to obtain the Ethernet data, wherein a quantity of the multiple chips is determined based on at least one of the following factors: the first quantity, a quantity of sampling points of at least one of the multiple chips, a bit width of the sampling point, or a bandwidth.

7. The first signal processing device according to claim 1, wherein the interface is further configured to obtain at least one of the following from the second signal processing device: a first quantity, a second quantity, a second quantity of multiple first antenna weight parameters, or a second quantity of multiple second antenna weight parameters.

8. The first signal processing device according to claim 1, wherein:

the transmission configuration information comprises indication information indicating whether processing is performed by the first processing circuit; or the transmission configuration information comprises first indication information and second indication information, the first indication information indicates a correspondence between a first frequency band range and the first processing circuit, and the second indication information indicates a correspondence between a second frequency band range and the second processing circuit.

9. The first signal processing device according to claim 1, wherein the scheduling circuit is configured to:

in response to the to-be-processed data being in a first frequency band range, schedule the to-be-processed data to the first processing circuit; or in response to the to-be-processed data being in a second frequency band range, schedule the to-be-processed data to the second processing circuit.

10. The first signal processing device according to claim 1, wherein the first splitting mode is a time domain splitting mode, the first processing circuit is configured to perform radio frequency (RF) processing on the to-be-processed data from the scheduling circuit, and the second splitting mode is a splitting mode inside a physical layer.

11. A second signal processing device, comprising:

a first baseband circuit, configured to generate time domain data, wherein a quantity of antenna channels corresponding to the time domain data is a first quantity;

a conversion circuit, configured to convert the time domain data into first Ethernet data; and an interface, configured to transmit the first Ethernet data to a first signal processing device through an optical fiber.

12. The second signal processing device according to claim 11, wherein the conversion circuit is configured to perform packet assembly on data of multiple chips in the time domain data, to obtain the first Ethernet data, wherein a quantity of the multiple chips is determined based on at least one of the following factors: the first quantity, a quantity of sampling points of at least one of the multiple chips, a bit width of the sampling point, or a bandwidth.

13. The second signal processing device according to claim 11, further comprising:

a second baseband circuit, configured to generate second Ethernet data; and wherein the interface is further configured to transmit the second Ethernet data to the first signal processing device.

14. The second signal processing device according to claim 11, further comprising:

a scheduling circuit;

wherein the interface is further configured to receive Ethernet data from the first signal processing device;

wherein the scheduling circuit is configured to schedule the Ethernet data to the conversion circuit or a second baseband circuit;

wherein the conversion circuit is configured to convert the Ethernet data scheduled by the scheduling circuit into the time domain data, wherein the quantity of antenna channels corresponding to the time domain data is the first quantity;

wherein the first baseband circuit is configured to process the corresponding time domain data; and wherein the second baseband circuit is configured to process the Ethernet data scheduled by the scheduling circuit.

15. The second signal processing device according to claim 11, wherein the interface is further configured to send transmission configuration information to the first signal processing device; and wherein:

the transmission configuration information comprises indication information indicating whether processing is performed by a first processing circuit; or the transmission configuration information comprises first indication information and second indication information, the first indication information indicates a correspondence between a first frequency band range and a first processing circuit of the first signal processing device, and the second indication information indicates a correspondence between a second frequency band range and a second processing circuit of the first signal processing device.

16. The second signal processing device according to claim 11, wherein the interface is configured to send at least one of the following to the first signal processing device:

the first quantity, a second quantity, a second quantity of multiple first antenna weight parameters, or a second quantity of multiple second antenna weight parameters, wherein the second quantity represents a quantity of antenna channels through which an antenna of the first signal processing device receives and transmits data.

17. A communication system, comprising:

a first signal processing device; and a second signal processing device, wherein the first signal processing device and the second signal processing device are connected through an optical fiber;

wherein the first signal processing device comprises:

a first interface, configured to perform Ethernet data transmission with the second signal processing device through the optical fiber;

a scheduling circuit, configured to schedule to-be-processed data to a first processing circuit or a second processing circuit based on transmission configuration information from the second signal processing device, and wherein the to-be-processed data comprises Ethernet data from the second signal processing device or uplink data from an antenna;

the first processing circuit, configured to process the to-be-processed data from the scheduling circuit according to a first splitting mode;

the second processing circuit, configured to process the to-be-processed data from the scheduling circuit according to a second splitting mode; and the antenna, configured to send processed data of the first processing circuit or the second processing circuit, or receive the uplink data; and wherein the second signal processing device comprises:

a first baseband circuit, configured to generate time domain data, wherein a quantity of antenna channels corresponding to the time domain data is a first quantity;

a conversion circuit, configured to convert the time domain data into first Ethernet data; and a second interface, configured to transmit the first Ethernet data to the first signal processing device through the optical fiber.

18. The communication system according to claim 17, wherein the first processing circuit comprises:

a conversion subcircuit, configured to implement conversion between the Ethernet data and time domain data; and a beamforming subcircuit, configured to implement conversion between a first quantity of multichannel first time domain data and a second quantity of multichannel second time domain data, wherein the second quantity corresponds to a quantity of antenna channels of the antenna, and the first quantity is less than the second quantity.

19. The communication system according to claim 18, wherein the to-be-processed data comprises the Ethernet data from the second signal processing device, and a quantity of antenna channels corresponding to the Ethernet data is the first quantity;

wherein the conversion subcircuit is configured to determine the multichannel first time domain data based on the Ethernet data; and the beamforming subcircuit is configured to determine the multichannel second time domain data based on the multichannel first time domain data and a second quantity of multiple first antenna weight parameters.

20. The communication system according to claim 19, wherein the conversion circuit is configured to perform packet assembly on data of multiple chips in the time domain data, to obtain the first Ethernet data, wherein a quantity of the multiple chips is determined based on at least one of the following factors: the first quantity, a quantity of sampling points of at least one of the multiple chips, a bit width of the sampling point, or a bandwidth.

* * * * *